US012680460B1

(12) United States Patent
Vitt et al.

(10) Patent No.: US 12,680,460 B1
(45) Date of Patent: Jul. 14, 2026

(54) TURBINE NOZZLE ALIGNMENT WITH COMBUSTOR OF GAS TURBINE ENGINES

(71) Applicant: General Electric Company, Evendale, OH (US)

(72) Inventors: Paul Hadley Vitt, Liberty Township, OH (US); Michal Osusky, Rexford, NY (US); Jonathan A. Filipa, Liberty Township, OH (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 19/096,966

(22) Filed: Apr. 1, 2025

(51) Int. Cl.
*F01D 9/04* (2006.01)

(52) U.S. Cl.
CPC .......... *F01D 9/041* (2013.01); *F05D 2200/11* (2013.01); *F05D 2200/12* (2013.01); *F05D 2200/13* (2013.01); *F05D 2200/14* (2013.01); *F05D 2200/221* (2013.01); *F05D 2200/261* (2013.01); *F05D 2200/262* (2013.01); *F05D 2220/3212* (2013.01); *F05D 2240/121* (2013.01); *F05D 2240/122* (2013.01); *F05D 2240/123* (2013.01); *F05D 2240/124* (2013.01); *F05D 2240/125* (2013.01); *F05D 2240/35* (2013.01); *F05D 2260/941* (2013.01); *F23R 2900/00005* (2013.01)

(58) Field of Classification Search
CPC ... F05D 2260/94–941; F05D 2260/961; F05D 2240/123–124; F05D 2220/3212; F01D 9/04–041; F23R 2900/00005
See application file for complete search history.

(56) References Cited

U.S. PATENT DOCUMENTS

| | | | | |
|---|---|---|---|---|
| 3,400,584 | A | 9/1968 | Beilman | |
| 4,072,049 | A | 2/1978 | Miller | |
| 4,089,216 | A | 5/1978 | Elias | |
| 5,099,430 | A | 3/1992 | Hirsch | |
| 5,239,864 | A | 8/1993 | von Pragenau | |
| 6,554,562 | B2 | 4/2003 | Dudebout et al. | |
| 7,377,743 | B2 * | 5/2008 | Flodman | F01D 5/186 415/115 |
| 7,640,802 | B2 | 1/2010 | King et al. | |
| 7,836,703 | B2 | 11/2010 | Lee et al. | |
| 8,041,520 | B2 | 10/2011 | Mesec | |

(Continued)

OTHER PUBLICATIONS

U.S. Appl. No. 18/517,240, filed Nov. 22, 2023.

*Primary Examiner* — Stephanie Sebasco Cheng
(74) *Attorney, Agent, or Firm* — Dority & Manning, P.A.

(57) ABSTRACT

A gas turbine engine includes a compressor section, a combustion section defining a combustion chamber, and a turbine section disposed in serial flow order along a central axis of the gas turbine engine. The combustion section includes a plurality of fuel nozzles in fluid communication with the combustion chamber. The plurality of fuel nozzles define a fuel nozzle pitch extending between a fuel nozzle centerline of adjacent ones of the plurality of fuel nozzles. The turbine section includes a plurality of vanes and a plurality of rotor blades. The turbine section defines a clocking pitch fraction in degrees about the central axis and the clocking pitch fraction is defined between a peak temperature region and a midpoint of a vane pitch. The vane pitch is defined between the leading edge of adjacent ones of the plurality of vanes.

9 Claims, 15 Drawing Sheets

(56) References Cited

U.S. PATENT DOCUMENTS

| | | | |
|---|---|---|---|
| 8,087,253 B2 | 1/2012 | Ning et al. | |
| 8,104,292 B2 * | 1/2012 | Lee | F01D 5/187 415/115 |
| 8,205,458 B2 * | 6/2012 | Lee | F01D 9/041 415/115 |
| 8,215,118 B2 | 7/2012 | Pieussergues et al. | |
| 8,439,626 B2 | 5/2013 | Ning et al. | |
| 9,216,821 B1 | 12/2015 | Holemans et al. | |
| 9,395,085 B2 | 7/2016 | Budmir et al. | |
| 9,581,085 B2 | 2/2017 | Bartz et al. | |
| 10,359,473 B2 | 7/2019 | Qiao et al. | |
| 10,422,535 B2 | 9/2019 | Knapp et al. | |
| 2015/0227677 A1 | 8/2015 | Sharma et al. | |
| 2018/0339770 A1 | 11/2018 | Brunken et al. | |

* cited by examiner (1) $$\tau = \frac{1}{\Lambda_S + 20 \cdot \left[\left(1 - \frac{0.7\Lambda_P + 0.3\Lambda_S}{4}\right) \cdot \sin\alpha_{te} - 0.00025 \cdot R_{b\_mid} \cdot \Omega\right)\right]^2}$$

(1.1) $$\tau = \frac{1}{\Lambda_S + 10(NJM)}$$

(1.2) $$NJM = 2[\Delta_T \cdot \sin\alpha_{te} - 0.00025 \cdot R_{b\text{-}mid} \cdot \Omega]^2$$

(1.3) $$\Delta T_w = 1 - \left(\frac{0.7\Lambda_P + (0.3)\Lambda_S}{4}\right)$$

(1.4) $$NJM = 2\left[\left(1 - \frac{0.7\Lambda_P + 0.3\Lambda_S}{4}\right) \cdot \sin\alpha_{te} - 0.00025 \cdot R_{bmid} \cdot \Omega\right)\right]^2$$

(2) $$\Lambda_S = 0.5(1 - \cos(2\pi(\theta_C + 0.125)))$$

(3) $$\Lambda_P = 0.5(1 - \cos(2\pi(\theta_C - 0.125)))$$

(4) $$\theta_n = \theta^f - \theta_c$$

(5) $$\tau = \max(\tau_{LV}, \tau_{TV})$$

(6.1) $$\tau_{LV} = \frac{1}{\Lambda_{LS} + 20 \cdot \left[\left(1 - \frac{0.7\Lambda_{LP} + 0.3\Lambda_{LS}}{4}\right) \cdot \sin\alpha_{te} - 0.00025 \cdot R_{b\text{-}mid} \cdot \Omega\right)\right]^2}$$

(6.2) $$\tau_{TV} = \frac{1}{\Lambda_{TS} + 20 \cdot \left[\left(1 - \frac{0.7\Lambda_{TP} + 0.3\Lambda_{TS}}{4}\right) \cdot \sin\alpha_{te} - 0.00025 \cdot R_{b\text{-}mid} \cdot \Omega\right)\right]^2}$$

(6.3) $$\tau_{LV} = \frac{1}{\Lambda_{LS} + 10 \cdot NJM_L}$$

(6.4) $$\tau_{TV} = \frac{1}{\Lambda_{TS} + 10 \cdot NJM_r}$$

(6.5) $$\Delta_{WL} = 1 - \frac{[0.7\Lambda_{LP} + 0.3\Lambda_{LS}]}{4}$$

(6.6) $$\Delta_{WT} = 1 - \frac{[0.7\Lambda_{TP} + 0.3\Lambda_{TS}]}{4}$$

(6.7) $$NJM_L = 2\left[1 - \frac{[0.7\Lambda_{LP} + 0.3\Lambda_{LS}]}{4} \cdot \sin\alpha_{te} - 0.00025 \cdot R_{b\text{-}mid} \cdot \Omega\right]^2$$

(6.8) $$NJM_T = 2\left[1 - \frac{[0.7\Lambda_{TP} + 0.3\Lambda_{TS}]}{4} \cdot \sin\alpha_{te} - 0.00025 \cdot R_{b\text{-}mid} \cdot \Omega\right]^2$$

(7) $$\Lambda_{LS} = 0.5(1 - \cos(2\pi(\theta_C + 0.83)))$$

(8) $$\Lambda_{LP} = 0.5(1 - \cos(2\pi(\theta_C + 0.67)))$$

(9) $$\Lambda_{TS} = 0.5(1 - \cos(2\pi(\theta_C + 0.33)))$$

(10) $$\Lambda_{TP} = 0.5(1 - \cos(2\pi(\theta_C + 0.17)))$$

(11) $$\theta_n = \theta^f - \theta_c$$

FIG. 5

TURBINE NOZZLE ALIGNMENT WITH COMBUSTOR OF GAS TURBINE ENGINES

FIELD

The present disclosure relates to gas turbine engines, and more particularly to turbine nozzle alignment with a combustor of gas turbine engines.

BACKGROUND

A gas turbine engine typically includes a fan and a turbomachine. The turbomachine generally includes an inlet, one or more compressors, a combustor, and at least one turbine. The compressors compress air, which is channeled to the combustor where it is mixed with fuel. The mixture is then ignited for generating hot combustion gases. The combustion gases are channeled to the turbine(s), which extract(s) energy from the combustion gases for powering the compressor(s), as well as for producing useful work to propel an aircraft in flight. The turbomachine is mechanically coupled to the fan for driving the fan during operation.

The turbine section of the gas turbine engine includes a plurality of stator vanes and a plurality of rotor blades. The plurality of stator vanes direct a flow of the combustion gases against the rotor blades. However, where the combustion gases exit the combustor, temperature pattern variations can create peak temperature regions that reduce durability of the stator vanes and the rotor blades of the turbine section. Accordingly, arrangements for the stator vanes and the rotor blades of the turbine section that improve durability and reduce cooling requirements are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5 lists various relationships between characteristics of a plurality of stator vanes and a plurality of rotor blades according to an exemplary embodiment of the present disclosure.

DETAILED DESCRIPTION

Figure 1:
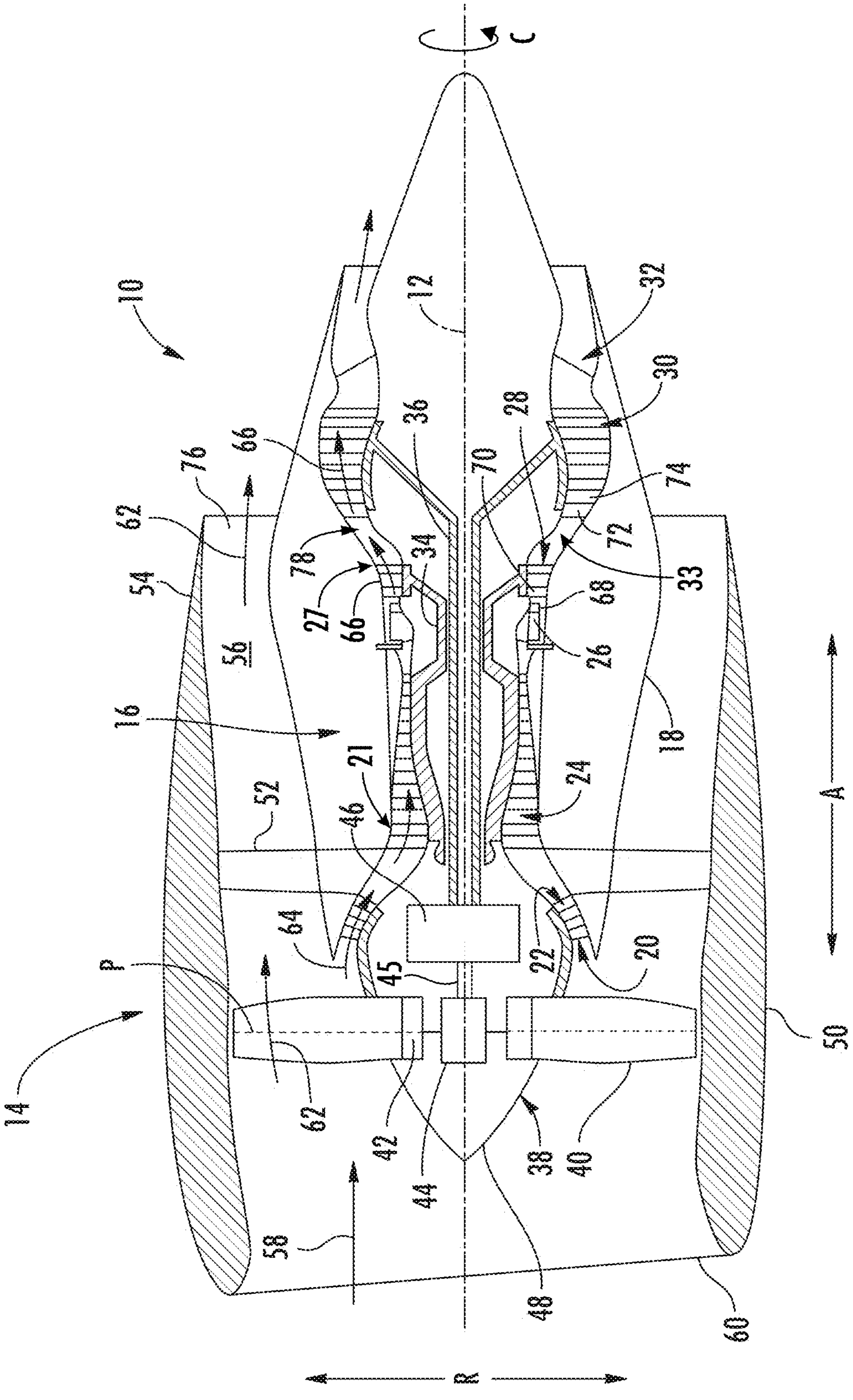
FIG. 1 is a schematic cross-sectional view of a gas turbine engine according to an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the term "rated speed" with reference to a gas turbine engine refers to a maximum rated speed of the gas turbine engine. For example, in an engine certified by the United States Federal Aviation Administration ("FAA"), the rated speed refers to a rotational speed of the engine during the highest sustainable and continuous power operation in the certification documents, such as a rotational speed of the gas turbine engine when operating under a maximum continuous operation.

The term "standard day operating condition" refers to ambient conditions of sea level altitude, 59 degrees Fahrenheit (15 degrees Celsius), and 60 percent relative humidity.

As used herein, a "bypass ratio" of a turbine engine is a ratio of bypass air through a bypass of the turbine engine to core air through a core inlet of a turbomachine of the turbine engine. For example, the bypass ratio is a ratio of bypass air entering the bypass airflow passage to core air entering the turbomachine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting a second wall/surface).

Generally, a gas turbine engine includes a fan and a turbomachine, with the turbomachine rotating the fan to generate thrust. The turbomachine includes a compressor section, a combustion section, a turbine section, and an exhaust section and defines a working gas flow path therethrough. The turbine section includes a plurality of stator vanes for directing a flow of combustion gases from the combustion section against a plurality of rotor blades. As the combustion gases exit the combustion section, a temperature profile or gradient forms that has hotter regions and cooler regions. For example, peak temperature regions may form within the turbine section as the combustion gases are convected into the turbine section from the combustion section. Heat from the peak temperature regions can negatively impact the plurality of stator vanes and the plurality of rotor blades. For example, the heat produced from the peak temperature regions reduces durability of the plurality of stator vanes and increases cooling requirements. Cooling air is typically supplied to the pressure side of the plurality of stator vanes. However, peak temperature regions may form adjacent a suction side of the plurality of stator vanes.

The present disclosure provides a means to reduce the peak temperature regions of the plurality of stator vanes in order to improve durability and reduce cooling requirements of the turbine section. The disclosure includes a clocking arrangement for the plurality of stator vanes relative to combustor cups of the combustion section. For example, the term "clocking" may refer to offsetting the position of the plurality of stator vanes relative to the combustor cups of the combustion section or aligning desired portions of the plurality of stator vanes with a center of the combustor cups. In particular, the plurality of stator vanes are clocked such that the pressure side of the plurality of stator vanes are aligned with the combustor cups. The inventors discovered, unexpectedly, in the course of designing a gas turbine engine having such a clocking arrangement that the costs associated with such clocking may be overcome by heat load benefits in at least certain designs, contrary to previous thinking and expectations. For example, the pressure side of the plurality of stator vanes is easier to cool, so reducing the temperature along the suction side of the plurality of stator vanes may reduce cooling requirements and improve durability of the turbine section. Additionally, cooling of the pressure side of the plurality of stator vanes dilutes the temperature of the combustion gases that flow downstream past the plurality of rotor blades.

With a goal of arriving at an improved gas turbine engine capable of improving durability and decreasing cooling requirements of the turbine section, the inventors proceeded in the manner of designing gas turbine engines having a turbine section with various rotor speeds of the plurality of rotor blades, midspan radii of the plurality of rotor blades, vane exit angles of the plurality of stator vanes, and clocking pitch fractions of the plurality of stator vanes; checking operability and aerodynamic characteristics of the designed gas turbine engines; redesigning the gas turbine engines to vary the noted parameters based on the impact on other aspects of the gas turbine engines; rechecking the operability and aerodynamic characteristics of the redesigned gas turbine engines; etc. during the design of several different stator vanes of the turbine section, including the stator vanes described herein, which are described below in greater detail.

Referring now to the drawings, FIG. 1 is a schematic cross-sectional view of a turbine engine 10 according to an exemplary embodiment of the present disclosure.

As shown in FIG. 1, the turbine engine 10 has an axial direction A (extending parallel to a longitudinal centerline axis 12) and a radial direction R that is normal to the axial direction A. In general, the turbine engine 10 includes a fan section 14 and a turbomachine 16 disposed downstream from the fan section 14.

The turbomachine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor ("LPC") 22 followed downstream by a high-pressure compressor ("HPC") 24, a combustion section 26, a turbine section 27, including a high-pressure turbine ("HPT") 28, followed downstream by a low-pressure turbine ("LPT") 30, and one or more core exhaust nozzles 32. A high-pressure ("HP") shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure ("LP") shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustion section 26, the turbine section 27, and the one or more core exhaust nozzles 32 together define a working gas flow path 33. In at least one example embodiment, the combustion section 26 may include a rich burn combustor or a lean burn combustor.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are rotatable together about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbomachine 16. The nacelle 50 is supported relative to the turbomachine 16 by a plurality of circumferentially spaced outlet guide vanes 52. Moreover, a downstream section 54 of the nacelle 50 extends over an outer portion of the turbomachine 16 to define a bypass airflow passage 56 therebetween. The one or more core exhaust nozzles 32 may extend through the nacelle 50 and be formed therein. In this exemplary embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the working gas flow path 33, or, more specifically, into the annular core inlet 20. The ratio between the first portion of air (bypass air 62) and the second portion of air (core air 64) is known as a bypass ratio. In some embodiments, the bypass ratio is greater than 18:1. The pressure of the core air 64 is then increased by the LPC 22, generating compressed air 65 (FIG. 2), and the compressed air 65 is routed through the HPC 24 and further compressed before being directed into the combustion section 26, where the compressed air 65 is mixed with fuel and burned to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio may be greater than 20:1.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate and supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator 72 that are coupled to the outer casing 18 and LPT rotor blades 74 that are coupled to the LP shaft 36, thus, causing the LP shaft 36 to rotate and supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 enables the HPT 28 to have a pressure expansion ratio in a range of 1.5:1 to 6:1, or 1.5:1 to 5.6:1 in some example embodiments, and the LPT 30 having a pressure expansion ratio in a range of 4.5:1 to 28:1.

The combustion gases 66 are subsequently routed through the one or more core exhaust nozzles 32 of the turbomachine 16 to provide propulsive thrust. Simultaneously with the flow of the core air 64 through the working gas flow path 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the turbomachine 16.

As noted above, the compressed air 65 (the core air 64) is mixed with the fuel in the combustion section 26 to generate a fuel and air mixture, and combusted, generating combustion gases 66 (combustion products). The fuel can include any type of fuel used for turbine engines, such as, for example, sustainable aviation fuels (SAF) including biofuels, JetA, or other hydrocarbon fuels. The fuel also may be a hydrogen-based fuel ($H_2$), and, while hydrogen-based fuel may include blends with hydrocarbon fuels, the fuel used herein is preferably unblended, and referred to herein as hydrogen fuel. In some embodiments, the hydrogen fuel may comprise substantially pure hydrogen molecules (i.e., diatomic hydrogen). The fuel may also be a cryogenic fuel. For example, when the hydrogen fuel is used, the hydrogen fuel may be stored in a liquid phase at cryogenic temperatures.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turboprop engines, ground power generation machines, or a combination thereof.

Figure 2:
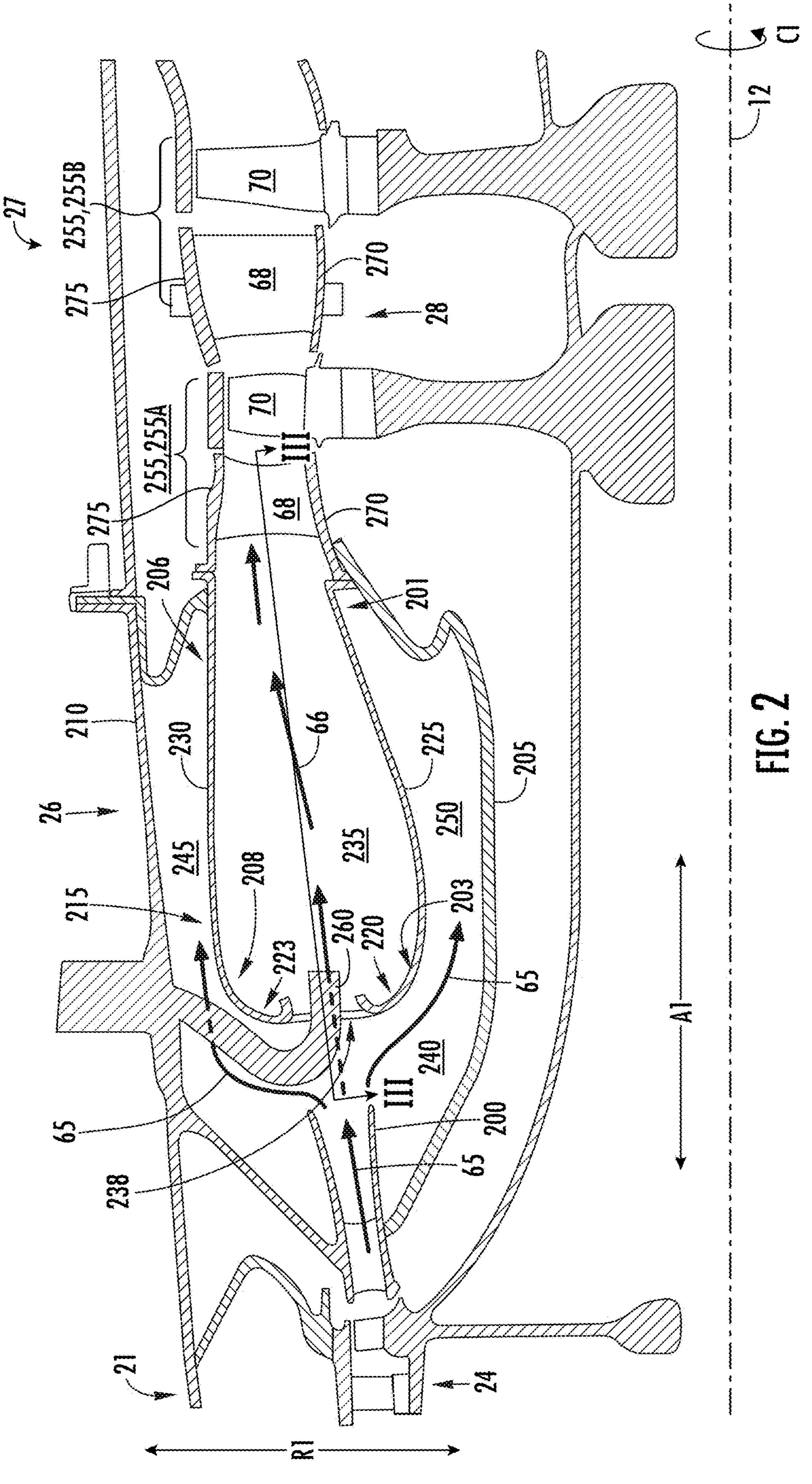
FIG. 2 is a side, cross-sectional view of a compressor section, a combustion section, and a turbine section of the gas turbine engine of FIG. 1 according to an exemplary embodiment of the present disclosure.

FIG. 2 is a side, cross-sectional view of the compressor section 21, the combustion section 26, and the turbine section 27 of the turbine engine 10 of FIG. 1 according to an exemplary embodiment of the present disclosure. More specifically, a rear end of the HPC 24, the combustion section 26, and a forward end of the HPT 28 are illustrated.

Compressed air 65 exits the HPC 24 through an annular diffuser 200 located at the rear end or outlet of the HPC 24 and diffuses into the combustion section 26. The combustion section 26 of the turbomachine 16 is annularly encased by an inner combustor casing 205 and an outer combustor casing 210 radially spaced from the inner combustor casing 205. The radially spaced inner combustor casing 205 and the outer combustor casing 210 both extend generally along axial direction A1 and surround a combustor assembly 215 in annular rings. The inner and outer combustor casings 205, 210 are joined together at the annular diffuser 200 at the forward end of the combustion section 26.

As shown, the combustor assembly 215 generally includes an inner liner 225 extending between a rear end 201 and a forward end 203 generally along the axial direction A1, as well as an outer liner 230 also extending between a rear end 206 and a forward end 208 generally along the axial direction A1. The inner and outer liners 225, 230 together at least partially define a combustion chamber 235 therebetween. The inner and outer liners 225, 230 are each attached to or formed integrally with an annular dome. More particularly, the annular dome includes an inner dome section 220 formed integrally with the forward end 203 of the inner liner 225 and an outer dome section 223 formed generally with the forward end 208 of the outer liner 230. Further, the inner and outer dome section 220, 223 may each be formed integrally (or alternatively may be formed of a plurality of components attached in any suitable manner) and may each extend along the circumferential direction C1 to define an annular shape. It should be appreciated, however, that in other example embodiments, the combustor assembly 215 may not include the inner and/or outer dome sections 220, 223; may include separately formed inner and/or outer dome sections 220,223 attached to the respective inner liner 225 and outer liner 230; or may have any other suitable configuration.

Referring still to FIG. 2, the combustor assembly 215 further includes a plurality of fuel air mixers 238 spaced along the circumferential direction C1 and positioned at least partially within the annular dome. More particularly, the plurality of fuel air mixers 238 are disposed at least partially between the outer dome section 223 and the inner dome section 220 along the radial direction R1. The plurality of fuel air mixers 238 include a plurality of fuel nozzles 260 also spaced along the circumferential direction C1. Compressed air 65 from the compressor section 21 of the turbine engine 10 flows into or through the plurality of fuel air mixers 238, where the compressed air 65 is mixed with fuel from the plurality of fuel nozzles 260 and ignited to create combustion gases 66 within the combustion chamber 235. The inner and outer dome sections 220, 223 are configured to assist in providing such a flow of the compressed air 65 from the compressor section 21 into or through the plurality of fuel air mixers 238. Additionally, or alternatively, a flow of the compressed air 65 may be provided from the compressor section 21 to the combustion chamber 235 through the inner and outer liners 225, 230.

As discussed above, the combustion gases 66 flow from the combustion chamber 235 into and through the turbine section 27 of the turbine engine 10, where a portion of thermal and/or kinetic energy from the combustion gases 66 is extracted via sequential stages of turbine stator vanes and turbine rotor blades within the HPT 28 and LPT 30. More specifically, as is depicted in FIG. 2, combustion gases 66 from the combustion chamber 235 flow into the HPT 28, located immediately downstream of the combustion chamber 235, where thermal and/or kinetic energy from the combustion gases 66 is extracted via sequential stages of HPT stator vanes 68 and HPT rotor blades 70.

As illustrated in FIG. 2, not all compressed air 65 flows into or directly through the plurality of fuel air mixers 238 and into the combustion chamber 235. Some of the compressed air 65 is discharged into a plenum 240 surrounding the combustor assembly 215. Plenum 240 is generally defined between the inner and outer combustor casings 205, 210 and the inner and outer liners 225, 230. The outer combustor casing 210 and the outer liner 230 define an outer plenum 245 generally disposed radially outward from the combustion chamber 235. The inner combustor casing 205 and the inner liner 225 define an inner plenum 250 generally disposed radially inward with respect to the combustion chamber 235. As compressed air 65 is diffused by the annular diffuser 200, some of the compressed air 65 flows radially outward into the outer plenum 245 and some of the compressed air 65 flows radially inward into the inner plenum 250.

The compressed air 65 flowing radially outward into the outer plenum 245 flows generally axially to the turbine section 27. Specifically, the compressed air 65 flows above the HPT stator vanes 68 and the HPT rotor blades 70. The outer plenum 245 may extend to the LPT 30 (shown in FIG. 1) as well.

In at least one example embodiment, the turbine section 27 includes an inner band 270 and an outer band 275 radially spaced from the inner band 270. The inner band 270 and the outer band 275 define at least a portion of the working gas flow path 33 (FIG. 1). The HPT stator vanes 68 may extend into the working gas flow path from the inner band 270, the outer band 275, or both the inner band 270 and the outer band 275.

As further shown in FIG. 2, for the embodiment depicted, the HPT 28 includes a plurality of turbine stages 255 with each of the plurality of turbine stages 255 including the plurality of stator vanes 68 and the plurality of rotor blades 70. For example, the plurality of turbine stages 255 includes a first stage 255A and a second stage 255B. The first stage 255A may be at a forward or most-upstream end of the HPT 28 and the second stage 255B may be downstream of the first stage 255A.

Figure 3A:
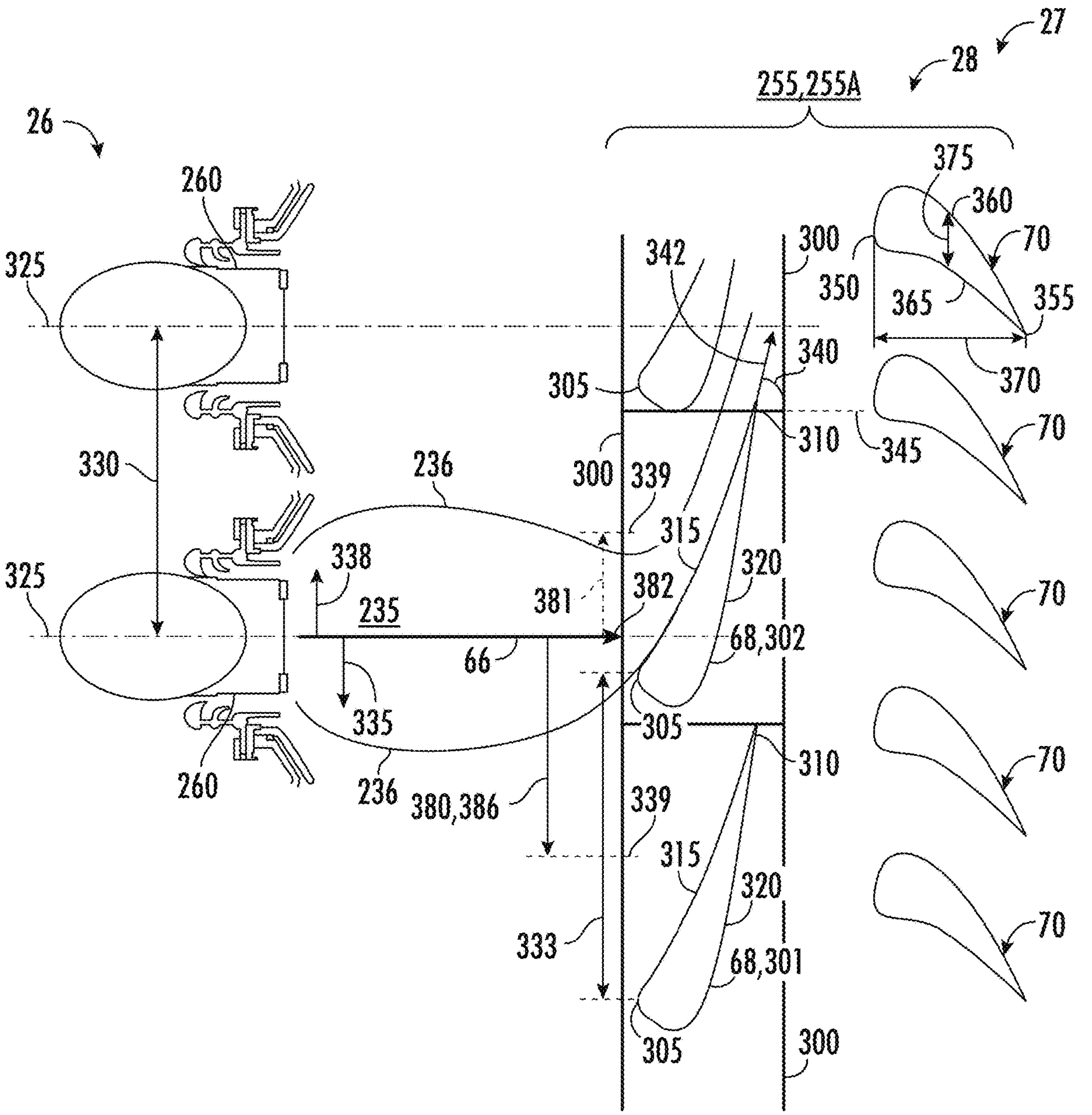
FIG. 3A is a top, cross-sectional view of a portion of the combustion section and the turbine section along line III-III of FIG. 2 according to an exemplary embodiment of the present disclosure.
Figure 3B:
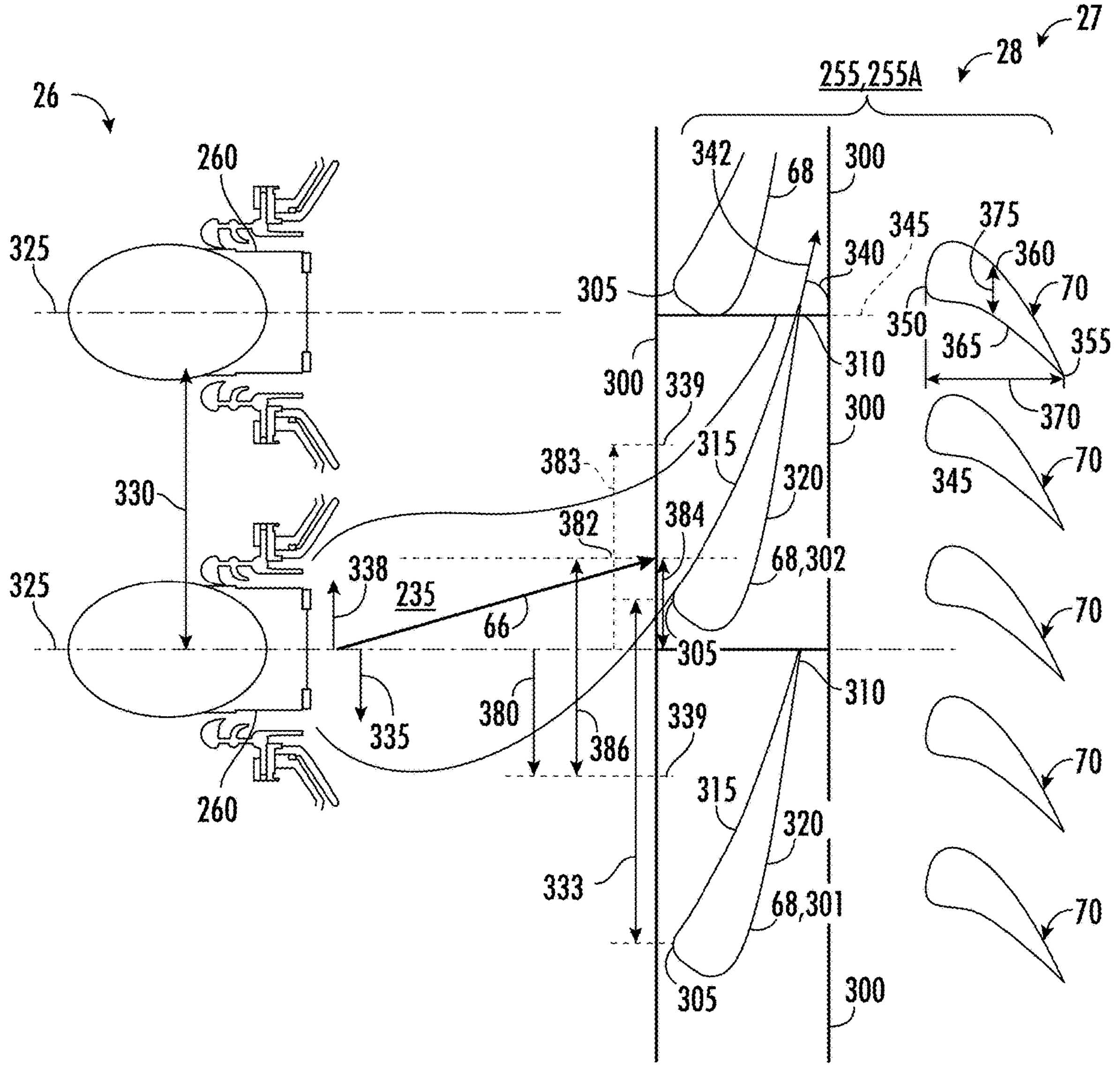
FIG. 3B is a top, cross-sectional view of a portion of the combustion section and the turbine section along line III-III of FIG. 2 according to an exemplary embodiment of the present disclosure.

FIGS. 3A-3B illustrate a top, cross-sectional view of a portion of the combustion section 26 and the turbine section 27 of FIG. 2 according to an exemplary embodiment of the present disclosure. More specifically, FIGS. 3A-3B illustrates a radially inward view of a portion of the combustion section 26 and the turbine section 27 of FIG. 2 projected onto a linear plane.

As shown in FIGS. 3A-3B, the plurality of turbine stages 255 may include a plurality of stator vane segments 300. For example, the plurality of stator vane segments 300 may define one or both of the inner band 270 (FIG. 2) and the outer band 275 (FIG. 2). The plurality of stator vanes 68 extend into the working gas flow path 33 from the plurality of stator vane segments 300 between the inner band 270 (FIG. 2) and the outer band 275 (FIG. 2).

In at least one example embodiment, the plurality of fuel nozzles 260 and the plurality of stator vanes 68 may be arranged in a 1:1 relationship. For example, as shown in FIGS. 3A-3B, each of the plurality of stator vane segments 300 includes one of the plurality of stator vanes 68. The plurality of stator vanes 68 include a leading edge 305, a trailing edge 310, a pressure side 315 extending between the leading edge 305 and the trailing edge 310, and a suction side 320 opposite the pressure side 315 and extending between the leading edge 305 and the trailing edge 310.

With reference to FIGS. 3A-3B, the plurality of stator vanes 68 of each of the plurality of stator vane segments 300 are clocked or offset relative to a fuel nozzle centerline 325. The fuel nozzle centerline 325 extends through a center of each of the plurality of fuel nozzles 260 parallel to the longitudinal centerline axis 12 (FIG. 2). Moreover, a fuel nozzle pitch 330 is defined between the fuel nozzle centerline 325 of adjacent ones of the plurality of fuel nozzles 260. The fuel nozzle pitch 330 is measured in degrees) (° about the longitudinal centerline axis 12 (FIG. 2).

The plurality of stator vanes 68 are equidistantly spaced about the longitudinal centerline axis 12 (FIG. 2). A reference point 339 of each of the plurality of stator vanes 68 is clocked in a first direction 335 by a clocking angle 380 relative to the fuel nozzle centerline 325. The first direction 335 is in a direction opposite of rotation of the plurality of rotor blades 70. The clocking angle 380 is an angular offset in degrees from the fuel nozzle centerline 325 in the first direction 335. Moreover, the reference point 339 is a midpoint of a vane pitch 333 of each of the plurality of stator vanes 68 extending between the leading edge 305 of adjacent ones of the plurality of stator vanes 68. For example, the vane pitch 333 is defined between the leading edge 305 of the first vane 301 and the leading edge 305 of the second vane 302.

Still referring to FIG. 3A, the clocking angle 380 is greater than or equal to 0.52 times the fuel nozzle pitch 330 and less than or equal to 0.8 times the fuel nozzle pitch 330 in the first direction 335. More specifically, the clocking angle 380 may be 0.65 times the fuel nozzle pitch 330.

In other example embodiments, the reference point 339 of the plurality of stator vanes 68 may be clocked in the second direction 338 by a second clocking angle 381. The second direction 338 is opposite the first direction 335 and in the direction of rotation of the plurality of rotor blades 70. The second clocking angle 381 is an angular offset in degrees from the fuel nozzle centerline 325 in the second direction 338. In such embodiments, the second clocking angle 381 may be greater than or equal to 0.2 times the fuel nozzle pitch 330 and less than or equal to 0.48 times the fuel nozzle pitch 330 in the second direction 338.

As shown in FIGS. 3A-3B, a flow of the combustion gases 66, indicated by lines 236, forms a peak temperature region 382 adjacent each of the plurality of stator vanes 68. Accordingly, the plurality of stator vanes 68 may be clocked, or offset from, the fuel nozzle centerline 325 such that the peak temperature region 382 is aligned with the pressure side 315 of each of the plurality of stator vanes 68.

With reference to FIG. 3A, the peak temperature region 382 may be aligned with the fuel nozzle centerline 325. Alternatively, with reference to FIG. 3B, the peak temperature region 382 may be offset from the fuel nozzle centerline 325 such that a peak temperature angle 384 is defined between the fuel nozzle centerline 325 and the peak temperature region 382. The peak temperature angle 384 is an angular offset of the peak temperature region 382 from the fuel nozzle centerline 325 in degrees in the second direction 338 about the longitudinal centerline axis 12 (FIG. 2). Moreover, the peak temperature angle 384 is greater than or equal to zero (0) and less than or equal to 0.6 times the fuel nozzle pitch 330. More specifically, the peak temperature angle 384 may be greater than or equal to zero (0) and less than or equal to 0.4 times the fuel nozzle pitch 330. For example, the peak temperature angle 384 may be 0.3 times the fuel nozzle pitch 330 in some example embodiments.

With reference to FIG. 3B, the clocking angle 380 is greater than or equal to 0.22 times the fuel nozzle pitch 330 and less than or equal to 0.5 times the fuel nozzle pitch 330 in the first direction 335. For example, the clocking angle 380 may be 0.35 times the fuel nozzle pitch 330 from the fuel nozzle centerline 325 in the first direction 335.

In other example embodiments, the reference point 339 of the plurality of stator vanes 68 may be clocked by a second clocking angle 383 in the second direction 338. For example, the second clocking angle 383 is greater than or equal to 0.5 times the fuel nozzle pitch 330 and less than or equal to 0.78 times the fuel nozzle pitch 330 in the second direction 338.

Referring again to FIGS. 3A-3B, a clocking pitch fraction 386 is defined between the reference point 339 and the peak temperature region 382, where the peak temperature region 382 is aligned with the fuel nozzle centerline 325 in FIG. 3A and the peak temperature region 382 is offset from the fuel nozzle centerline 325 in FIG. 3B. The clocking pitch fraction 386 is an angular offset of the peak temperature region 382 from the reference point 339 of one of the plurality of stator vanes 68 about the longitudinal centerline axis 12 (FIG. 2). The clocking pitch fraction 386 is greater than or equal to 0.51 times the fuel nozzle pitch 330 and less than or equal to 0.81 times the fuel nozzle pitch 330. More specifically, the clocking pitch fraction may be 0.65 times the fuel nozzle pitch 330 in some example embodiments.

Moreover, still referring to FIGS. 3A-3B, each of the plurality of stator vanes 68 define a vane exit angle 340. The vane exit angle 340 is defined between a vane reference line 345 extending through the trailing edge 310 of each of the plurality of stator vanes 68 parallel to the fuel nozzle centerline 325 and the longitudinal centerline axis 12 and an average exit path 342 of the combustion gases 66 along the pressure side 315 at the trailing edge 310, indicated by arrow 342. For example, as shown in FIGS. 3A-3B, the average exit path 342 extends from the trailing edge 310 of each of the plurality of stator vanes 68. Moreover, the average exit path 342 extends along a centerline extending through the trailing edge 310 between pressure side 315 and the suction side 320. The vane exit angle 340 is greater than or equal to 65° and less than or equal to 80°.

As shown in FIGS. 3A-3B, the plurality of rotor blades 70 include a blade leading edge 350, a blade trailing edge 355, a first blade side 360 extending between the blade leading edge 350 and the blade trailing edge 355, and a second blade side 365 opposite the first blade side 360 and extending between the blade leading edge 350 and the blade trailing edge 355. Each of the plurality of rotor blades 70 define a blade chord 370 extending between the blade leading edge 350 and the blade trailing edge 355 along the longitudinal centerline axis 12 (FIG. 2). Each of the plurality of rotor blades 70 also define a blade midspan radius 375 extending between the first blade side 360 and the second blade side 365 opposite the first blade side 360 at a center of the blade chord 370. The blade midspan radius 375 extends perpendicular to the blade chord 370 and the longitudinal centerline axis 12 (FIG. 2).

Figure 4A:
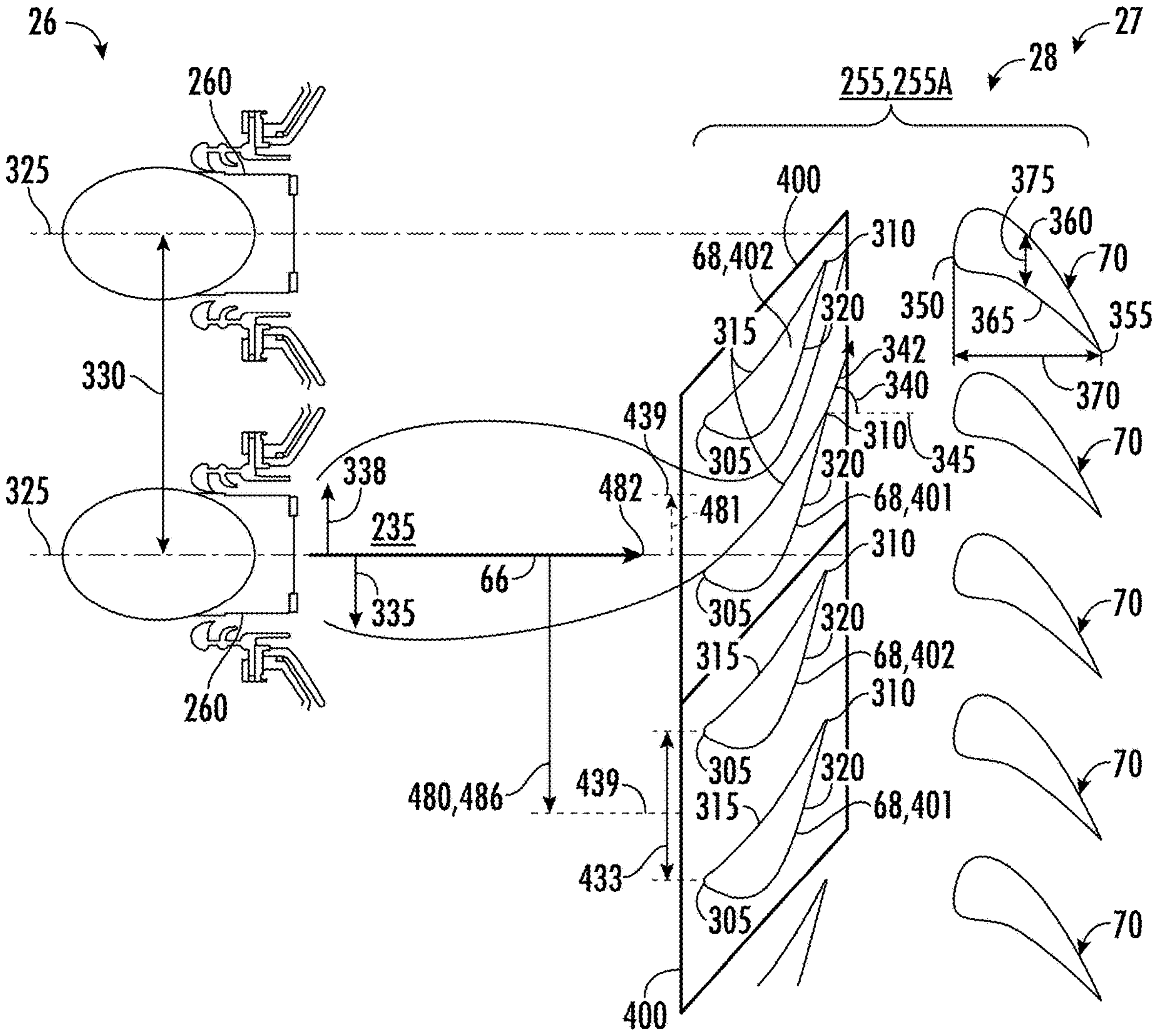
FIG. 4A is a top, cross-sectional view of a portion of the combustion section and the turbine section along line III-III of FIG. 2 according to an exemplary embodiment of the present disclosure.
Figure 4B:
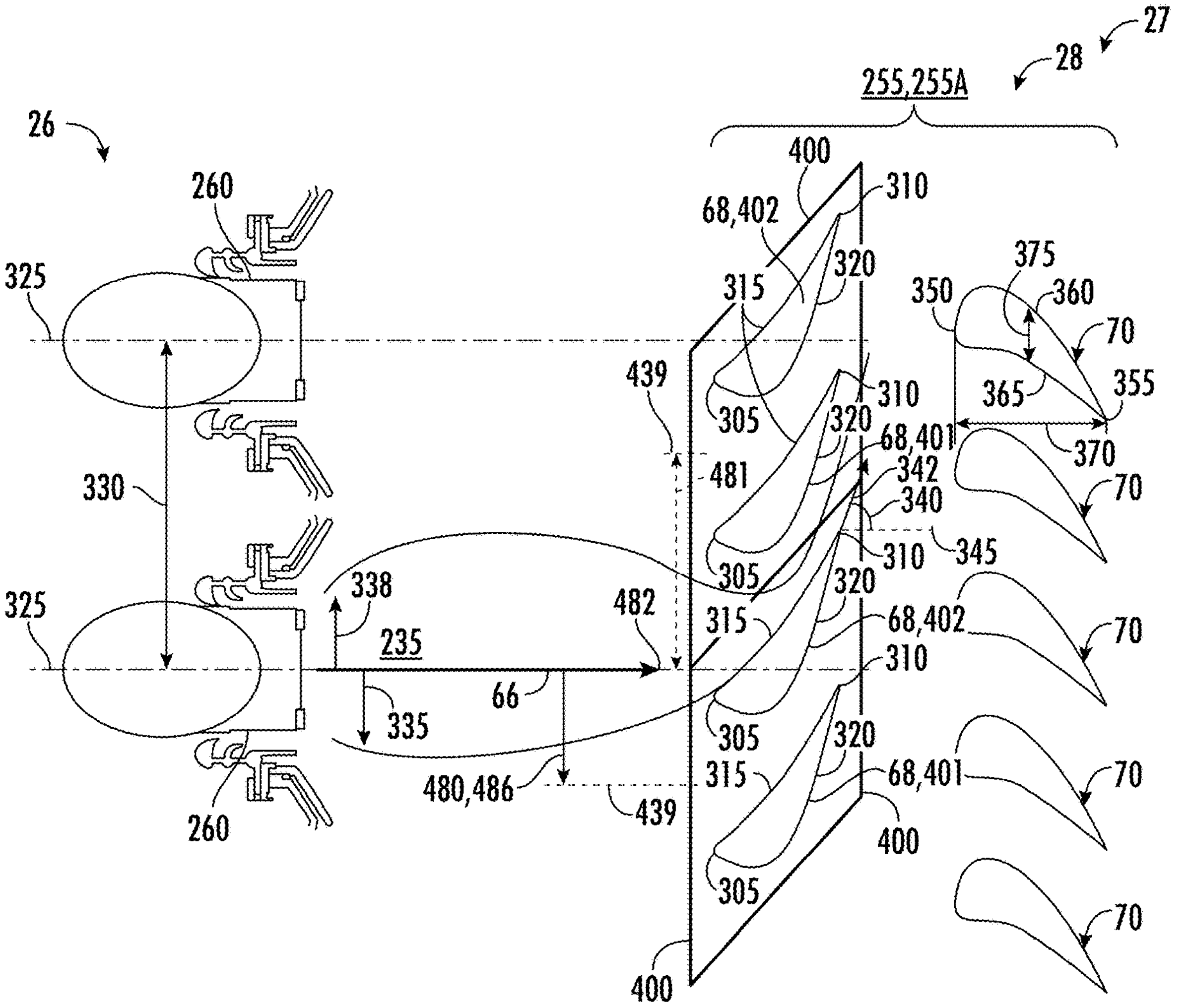
FIG. 4B is a top, cross-sectional view of a portion of the combustion section and the turbine section along line III-III of FIG. 2 according to an exemplary embodiment of the present disclosure.

FIGS. 4A-4D illustrate a top, cross-sectional view of a portion of the combustion section 26 and the turbine section 27 along line III-III of FIG. 2 according to an exemplary embodiment of the present disclosure. More specifically, FIGS. 4A-4B illustrates a radially inward view of a portion of the combustion section 26 and the turbine section 27 of FIG. 2 projected onto a linear plane.

As shown in FIGS. 4A-4D, the plurality of turbine stages 255 include a plurality of stator vane segments 400. The plurality of stator vane segments 400 may be similar or analogous to the plurality of stator vane segments 300 discussed above with respect to FIGS. 3A-3B. For example, the plurality of stator vane segments 400 define one or both of the inner band 270 and the outer band 275. The plurality of stator vanes 68 also extend into the working gas flow path 33 from the plurality of stator vane segments 400.

As shown in FIGS. 4A-4B, the plurality of fuel nozzles 260 and the plurality of stator vanes 68 are arranged in a 1:2 relationship. For example, each of the plurality of stator vane segments 400 include two of the plurality of stator vanes 68. For example, each of the plurality of stator vane segments 400 includes a leading vane (LV) 401 and a trailing vane (TV) 402. Moreover, each of the plurality of stator vanes 68 include a leading edge 305, a trailing edge 310, a pressure side 315 extending between the leading edge 305 and the trailing edge 310, and a suction side 320 opposite the pressure side 315 and extending between the leading edge 305 and the trailing edge 310.

The plurality of stator vanes 68 of each of the plurality of stator vane segments 400 are clocked, or offset, relative to the fuel nozzle centerline 325 extending through the center of the plurality of fuel nozzles 260. For example, the plurality of stator vanes 68 of each of the plurality of stator vane segments 400 may be clocked in the first direction 335 or the second direction 338, as discussed with respect to FIGS. 3A-3B. More particularly, a reference point 439 of the plurality of stator vanes 68 of each of the plurality of stator vane segments 400 is clocked in the first direction 335 or the second direction 338. The reference point 439 is a midpoint of a vane pitch 433 extending between the leading edge 305 of adjacent ones of the plurality of stator vanes 68 for each of the plurality of stator vane segments 400. For example, the vane pitch 433 extends between the leading edge 305 of the leading vane 401 and the leading edge 305 of the trailing vane 402 for each of the plurality of stator vane segments 400.

With reference to FIGS. 4A-4B, the reference point 439 of each of the plurality of stator vane segments 400 is clocked a clocking angle 480 in the first direction 335 relative to the fuel nozzle centerline 325. The clocking angle 480 is an angular offset in degrees from the fuel nozzle centerline 325 about the longitudinal centerline axis 12 (FIG. 2). Moreover, as shown in FIG. 4A, the plurality of stator vanes 68 of each of the plurality of stator vane segments 400 may be clocked relative to the leading vane 401. For example, the clocking angle 480 is greater than or equal to 0.77 times the fuel nozzle pitch 330 and less than or equal to 0.95 times the fuel nozzle pitch 330 in the first direction 335. More specifically, the clocking angle 480 may be 0.85 times the fuel nozzle pitch 330 in the first direction 335.

In other example embodiments, the leading vane 401 of the plurality of stator vanes of each of the plurality of stator vane segments 400 may be clocked by a second clocking angle 481 in the second direction 338 relative to the fuel nozzle centerline 325. For example, the second clocking angle 481 is greater than or equal to 0.05 times the fuel nozzle pitch 330 and less than or equal to 0.23 times the fuel nozzle pitch 330 in the second direction 338.

In additional example embodiments, as shown in FIG. 4B, the plurality of stator vanes 68 of each of the plurality of stator vane segments 400 are clocked relative to the trailing vane 402. In such embodiments, the clocking angle 480 is greater than or equal to 0.28 times the fuel nozzle pitch 330 and less than or equal to 0.45 times the fuel nozzle pitch 330. More specifically, the clocking angle 480 may be 0.35 times the fuel nozzle pitch 330.

In other example embodiments, the trailing vane 402 of the plurality of stator vanes 68 of each of the plurality of stator vane segments 400 may be clocked by the second clocking angle 481 relative to the fuel nozzle centerline 325 in the second direction 338. For example, the second clocking angle 481 is greater than or equal to 0.55 times the fuel nozzle pitch 330 and less than or equal to 0.72 times the fuel nozzle pitch 330 in the second direction 338.

With reference to FIGS. 4A-4D, the combustion gases 66 form a peak temperature region 482 adjacent the plurality of stator vanes 68. As discussed above, the plurality of stator vanes 68 of each of the plurality of stator vane segments 400 may be clocked, or offset, relative to the fuel nozzle centerline 325 such that the peak temperature region 482 is aligned with the pressure side 315. As shown in FIG. 4A, the peak temperature region 482 may form adjacent the pressure side 315 of the leading vane 401 based on the plurality of stator vanes 68 being clocked relative to the leading vane 401. Similarly, as shown in FIG. 4B, the peak temperature region 482 may form adjacent the pressure side 315 of the trailing vane 402 based on the plurality of stator vanes 68 being clocked relative to the trailing vane 402. Moreover, as shown in FIGS. 4A-4B, the peak temperature region 482 may be aligned with the fuel nozzle centerline 325 in some example embodiments.

Figure 4C:
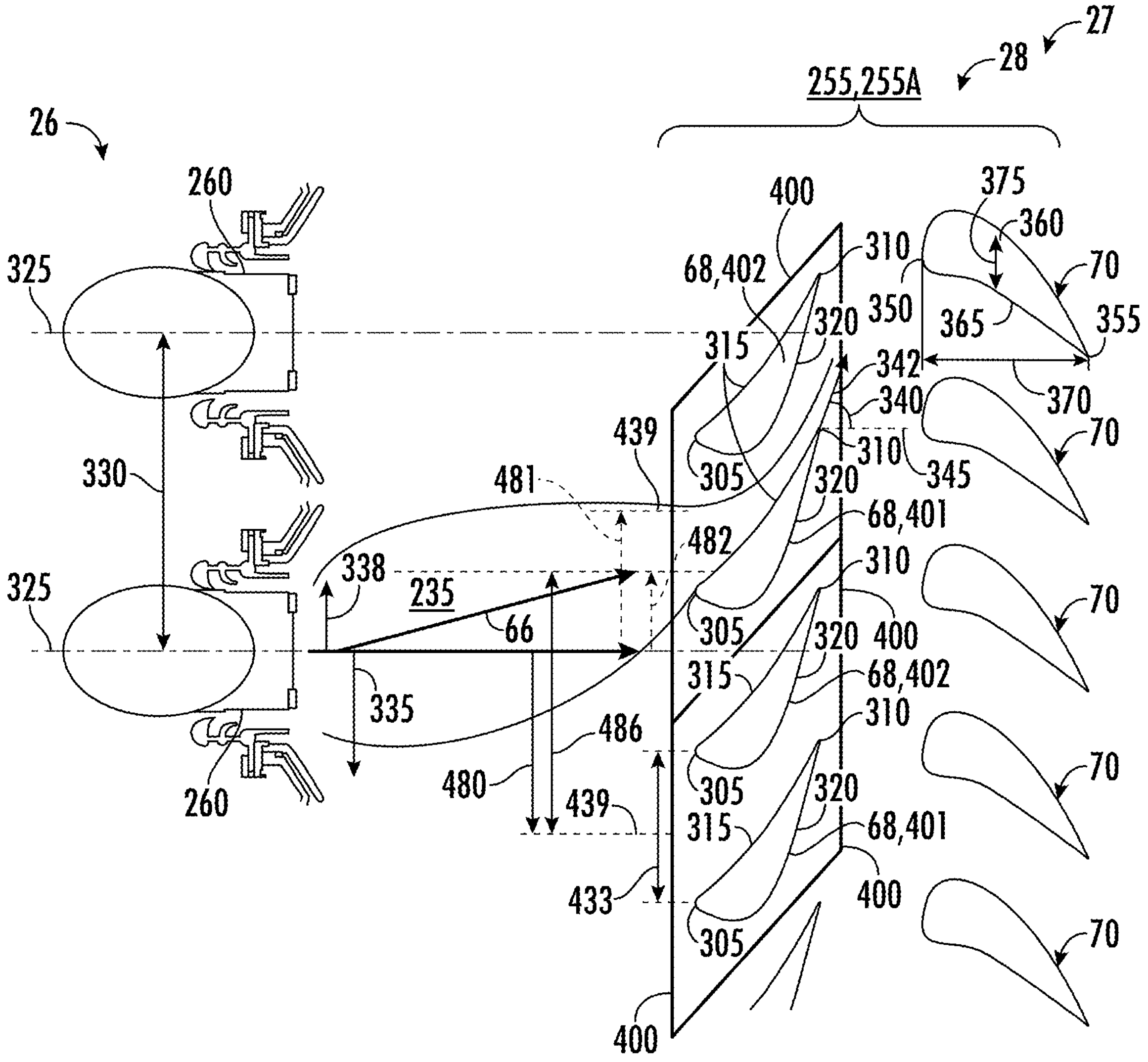
FIG. 4C is a top, cross-sectional view of a portion of the combustion section and the turbine section along line III-III of FIG. 2 according to an exemplary embodiment of the present disclosure.
Figure 4D:
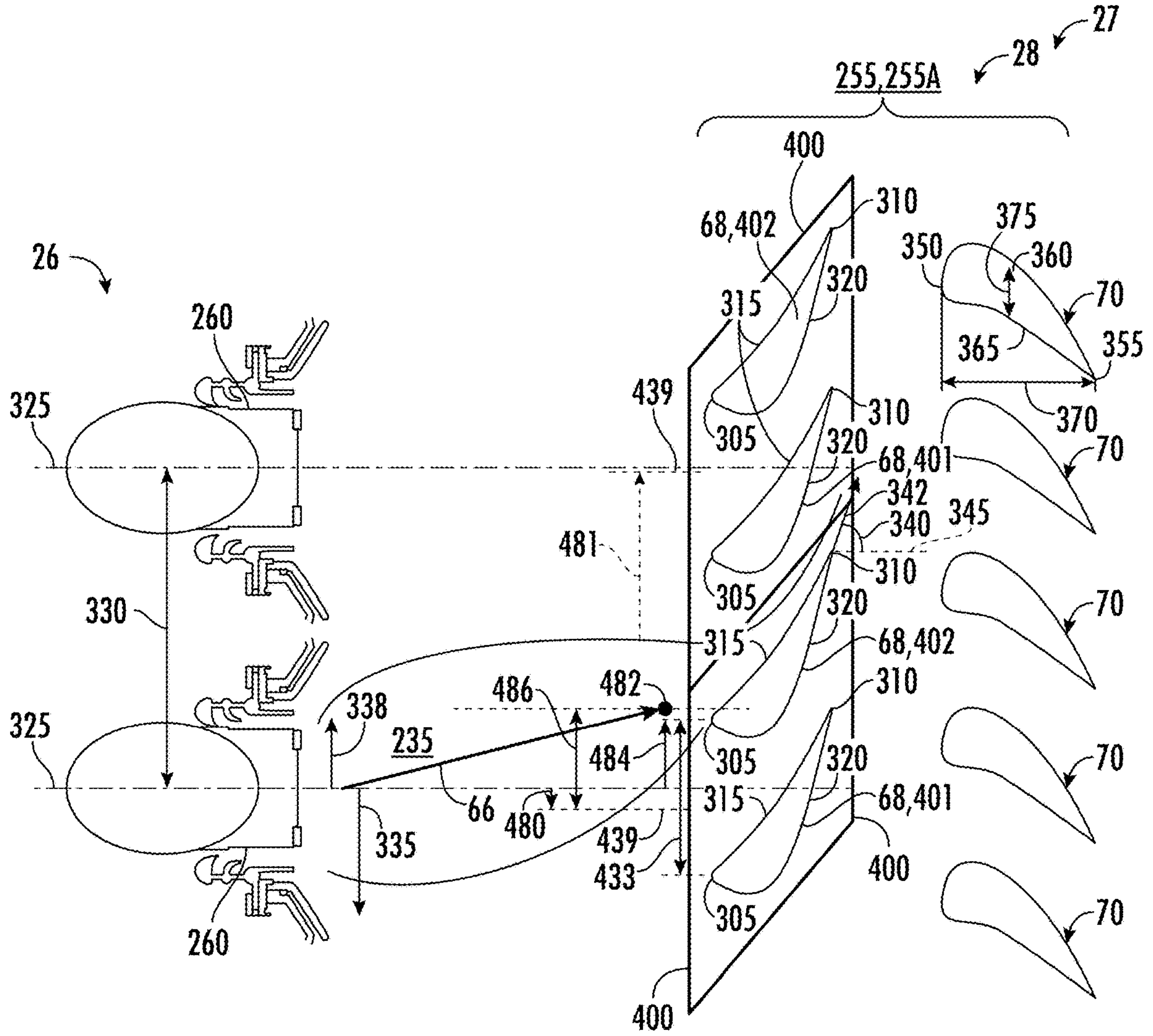
FIG. 4D is a top, cross-sectional view of a portion of the combustion section and the turbine section along line III-III of FIG. 2 according to an exemplary embodiment of the present disclosure.

Referring now to FIGS. 4C-4D, the peak temperature region 482 is offset from the fuel nozzle centerline 325. For example, the peak temperature region 482 is offset from the fuel nozzle centerline 325 and defines a peak temperature angle 484. The peak temperature angle 484 is an angular offset of the peak temperature region 482 in the second direction 338 from the fuel nozzle centerline 325 in degrees about the longitudinal centerline axis 12 (FIG. 2). The peak temperature angle 484 is greater than or equal to zero (0) and less than or equal to 0.6 times the fuel nozzle pitch 330. More specifically, the peak temperature angle 484 may be greater than zero (0) and less than or equal to 0.4 times the fuel nozzle pitch 330. For example, the peak temperature angle 484 may be 0.3 times the fuel nozzle pitch 330.

In other example embodiments (not shown), the peak temperature angle 484 may be an angular offset of the peak temperature region 482 from the fuel nozzle centerline 325 in degrees in the first direction 335 about the longitudinal centerline axis 12 (FIG. 2). In such embodiments, the peak temperature angle 484 is greater than or equal to zero (0) and less than or equal to 0.4 times the fuel nozzle pitch 330 in the first direction 335. More specifically, the peak temperature angle 484 may be 0.2 times the fuel nozzle pitch 330 in the first direction 335.

Moreover, the reference point 439 of the plurality of stator vanes 68 of each of the plurality of stator vane segments 400 may be clocked the clocking angle 480 relative to the fuel nozzle centerline 325. With reference to FIG. 4C, the plurality of stator vanes 68 of each of the plurality of stator vane segments 400 may be clocked in the first direction 335 relative to the leading vane 401. In such example embodiments, the clocking angle 480 of the reference point 439 is greater than or equal to 0.47 times the fuel nozzle pitch 330 and less than or equal to 0.65 times the fuel nozzle pitch 330 in the first direction 335. More specifically, the clocking angle 480 of the reference point 439 may be 0.55 times the fuel nozzle pitch 330 in the first direction 335.

In other example embodiments (not shown), the plurality of stator vanes 68 of each of the plurality of stator vane segments 400 may be clocked by the second clocking angle 481 in the second direction 338 based on the leading vane 401. In such embodiments, the second clocking angle 481 is greater than or equal to 0.35 times the fuel nozzle pitch 330 and less than or equal to 0.53 times the fuel nozzle pitch 330 in the second direction 338. More specifically, the second clocking angle 481 may be 0.45 times the fuel nozzle pitch 330 in the second direction 338.

With reference to FIG. 4D, the plurality of stator vanes 68 of each of the plurality of stator vane segments 400 may be clocked based on the trailing vane 402. In such example embodiments, the clocking angle 480 of the reference point 439 is greater than or equal to 0.02 times the fuel nozzle pitch 330 and less than or equal to 0.15 times the fuel nozzle pitch 330 in the first direction 335. More specifically, the clocking angle 480 of the reference point 439 may be 0.05 times the fuel nozzle pitch 330 in the first direction 335.

In other example embodiments (not shown), the plurality of stator vanes 68 may be clocked by the second clocking angle 481 in the second direction 338 based on the trailing vane 402. In such embodiments, the second clocking angle 481 is greater than or equal to 0.85 times the fuel nozzle pitch 330 and less than or equal to 0.98 times the fuel nozzle pitch 330 in the second direction 338. More specifically, the second clocking angle 481 may be 0.95 times the fuel nozzle pitch 330 in the second direction 338.

Referring again to FIGS. 4A-4D, a clocking pitch fraction 486 is defined between the reference point 439 of each of the plurality of stator vane segments 400 and the peak temperature region 482. The clocking pitch fraction 486 is an angular offset of the peak temperature region 482 from the reference point 439 in degrees about the longitudinal centerline axis 12 (FIG. 2). Moreover, the clocking angle 480 may be determined by subtracting the peak temperature angle 484 from the clocking pitch fraction 486.

In example embodiments where the plurality of stator vanes 68 are clocked based on the leading vane 401, as shown in FIGS. 4A and 4C, the clocking pitch fraction 486 is greater than or equal to 0.77 times the fuel nozzle pitch 330 and less than or equal to 0.95 times the fuel nozzle pitch 330. More specifically, the clocking pitch fraction 486 may be 0.85 times the fuel nozzle pitch 330 in such example embodiments. In example embodiments where the plurality of stator vanes 68 are clocked based on the trailing vane 402, as shown in FIGS. 4B and 4D, the clocking pitch fraction 486 is greater than or equal to 0.28 times the fuel nozzle pitch 330 and less than or equal to 0.45 times the fuel nozzle pitch 330. More specifically, the clocking pitch fraction 486 may be 0.35 times the fuel nozzle pitch 330 in such example embodiments.

Moreover, still referring to FIGS. 4A-4D, the plurality of stator vanes 68 define the vane exit angle 340. The vane exit angle 340 is defined between the vane reference line 345 extending through the trailing edge 310 of each of the plurality of stator vanes 68 parallel to the fuel nozzle centerline 325 and the longitudinal centerline axis 12 (FIG. 2) and the average exit path 342 of the combustion gases 66 along the pressure side 315 at the trailing edge 310 of each of the plurality of stator vanes 68. The average exit path 342 extends from the trailing edge 310 of each of the plurality of stator vanes 68. The vane exit angle 340 is greater than or equal to 65° and less than or equal to 80°.

As shown in FIGS. 4A-4D, each of the plurality of rotor blades 70 include a blade leading edge 350, a blade trailing edge 355, a first blade side 360 extending between the blade leading edge 350 and the blade trailing edge 355, and a second blade side 365 opposite the first blade side 360 and extending between the blade leading edge 350 and the blade trailing edge 355. Each of the plurality of rotor blades 70 define a blade chord 370 extending between the blade leading edge 350 and the blade trailing edge 355. Each of the plurality of rotor blades 70 also define a blade midspan radius 375 extending between the first blade side 360 and the second blade side 365 opposite the first blade side 360 at a center of the blade chord 370. The blade midspan radius 375 extends perpendicular to the blade chord 370 and the longitudinal centerline axis 12.

The inventors developed multiple gas turbine engines and determined that a rotor speed Ω of the plurality of rotor blades 70, a vane exit angle $\alpha_{te}$ of the plurality of stator vanes 68, a midspan radius $R_{b\_mid}$ of the plurality of rotor blades 70, and a clocking pitch fraction $\theta_C$ of the plurality of stator vanes 68 have a significant effect on the durability of the plurality of stator vanes 68 and the plurality of rotor blades 70 of the turbine section 27. Moreover, one or more of the rotor speed Q, the vane exit angle $\alpha_{te}$, the midspan radius $R_{b\_mid}$, and the clocking pitch fraction $\theta_C$ are based on whether the turbine section 27 is in the 1:1 configuration discussed with respect to FIGS. 3A-3B or the 1:2 configuration discussed with respect to FIGS. 4A-4D.

The inventors created solutions for increasing durability of the plurality of stator vanes 68 and the plurality of rotor blades 70 by decreasing peak temperature regions on the suction side 320 of the plurality of stator vanes 68. Table 1A below illustrates 20 examples (denoted Ex. 1-20) of gas turbine engines 10 having the combustion section 26 and the turbine section 27 arranged in the 1:1 configuration developed by the inventors. Table 1B below illustrates 30 examples (denoted Ex. 1-30) of gas turbine engines 10 having the combustion section 26 and the turbine section 27 arranged in the 1:2 configuration developed by the inventors. Moreover, for the 1:2 configurations, Table 1B indicates whether the plurality of stator vanes are clocked relative to the trailing vane 402 (TV) or the leading vane 401 (LV). Tables 1A and 1B include the clocking pitch fraction $\theta_C$, the vane exit angle $\alpha_{te}$, and the rotor speed $\Omega$ multiplied by the midspan radius $R_{b\_mid}$ ($R_{b\_mid} \cdot \Omega$) for each of the examples.

TABLE 1A

| 1:1 Configuration | | | |
|---|---|---|---|
| Parameter Units | $\theta_C$ (Clocking Pitch Fraction) n/a | $\alpha_{te}$ (Vane Exit Angle) degrees | $R_{b\_mid} \cdot \Omega$ (Midspan Radius multiplied by Rotor Speed) ft/s |
| Ex. 1 | 0.67 | 65 | 2000 |
| Ex. 2 | 0.66 | 73 | 1725 |
| Ex. 3 | 0.62 | 65 | 1450 |
| Ex. 4 | 0.6 | 78 | 1650 |
| Ex. 5 | 0.65 | 78 | 1650 |
| Ex. 6 | 0.7 | 78 | 1650 |
| Ex. 7 | 0.52 | 65 | 2000 |
| Ex. 8 | 0.7 | 65 | 1250 |
| Ex. 9 | 0.52 | 80 | 2000 |
| Ex. 10 | 0.8 | 65 | 2000 |
| Ex. 11 | 0.52 | 65 | 1450 |
| Ex. 12 | 0.52 | 80 | 1450 |
| Ex. 13 | 0.51 | 80 | 1450 |
| Ex. 14 | 0.51 | 80 | 1250 |
| Ex. 15 | 0.81 | 65 | 2000 |
| Ex. 16 | 0.75 | 78 | 1650 |
| Ex. 17 | 0.8 | 80 | 2000 |
| Ex. 18 | 0.8 | 65 | 1450 |
| Ex. 19 | 0.8 | 78 | 1650 |
| Ex. 20 | 0.8 | 80 | 1450 |

TABLE 1B

| 1:2 Configuration | | | | |
|---|---|---|---|---|
| Parameter Units | Arrangement n/a | $\theta_C$ (Clocking Pitch Fraction) n/a | $\alpha_{te}$ (Vane Exit Angle) degrees | $R_{b\_mid} \cdot \Omega$ (Midspan Radius multiplied by Rotor Speed) ft/s |
| Ex. 2 | 1:2 LV | 0.3 | 78 | 1650 |
| Ex. 3 | 1:2 TV | 0.8 | 78 | 1650 |
| Ex. 4 | 1:2 LV | 0.35 | 80 | 2000 |
| Ex. 5 | 1:2 TV | 0.85 | 80 | 2000 |
| Ex. 6 | 1:2 LV | 0.28 | 80 | 1450 |
| Ex. 7 | 1:2 TV | 0.86 | 72.5 | 1725 |
| Ex. 8 | 1:2 TV | 0.77 | 80 | 1450 |
| Ex. 9 | 1:2 LV | 0.37 | 72.5 | 1725 |
| Ex. 10 | 1:2 TV | 0.88 | 80 | 1450 |
| Ex. 11 | 1:2 LV | 0.35 | 65 | 1250 |
| Ex. 12 | 1:2 TV | 0.85 | 65 | 1250 |
| Ex. 13 | 1:2 LV | 0.4 | 78 | 1650 |
| Ex. 14 | 1:2 TV | 0.9 | 78 | 1650 |
| Ex. 15 | 1:2 LV | 0.28 | 80 | 2000 |
| Ex. 16 | 1:2 LV | 0.28 | 65 | 1450 |
| Ex. 17 | 1:2 TV | 0.77 | 80 | 2000 |
| Ex. 18 | 1:2 TV | 0.77 | 65 | 1450 |
| Ex. 19 | 1:2 LV | 0.45 | 80 | 2000 |
| Ex. 20 | 1:2 TV | 0.95 | 80 | 2000 |
| Ex. 21 | 1:2 LV | 0.45 | 80 | 1450 |
| Ex. 22 | 1:2 TV | 0.95 | 80 | 1450 |
| Ex. 23 | 1:2 LV | 0.45 | 65 | 2000 |
| Ex. 24 | 1:2 TV | 0.95 | 65 | 2000 |
| Ex. 25 | 1:2 LV | 0.45 | 65 | 1450 |
| Ex. 26 | 1:2 TV | 0.95 | 65 | 1450 |
| Ex. 27 | 1:2 LV | 0.28 | 65 | 2000 |

TABLE 1B-continued

| 1:2 Configuration | | | | |
|---|---|---|---|---|
| Parameter Units | Arrangement n/a | $\theta_C$ (Clocking Pitch Fraction) n/a | $\alpha_{te}$ (Vane Exit Angle) degrees | $R_{b\_mid} \cdot \Omega$ (Midspan Radius multiplied by Rotor Speed) ft/s |
| Ex. 28 | 1:2 TV | 0.77 | 65 | 2000 |
| Ex. 29 | 1:2 LV | 0.48 | 65 | 1250 |
| Ex. 30 | 1:2 TV | 0.65 | 65 | 1250 |

The inventors found that gas turbine engine designs with parameters defined in Examples 1-15 of Table 1A and examples 1-30 of Table 1B exhibit increased durability of the plurality of stator vanes 68 and the plurality of rotor blades 70 while remaining within current engine constraints. Conversely, Examples 16-20 of Table 1A have relatively low durability for the particular engine environment.

The examples developed by the inventors in Tables 1A and 1B can be characterized by a turbine stage durability factor t that can be used to identify those design in Examples 1-15 of Table 1A and Examples 1-30 of Table 1B that meet durability and cooling requirements. The turbine stage durability factor t can be thought of as an indicator of the durability of the plurality of stator vanes and the plurality of rotor blades of the turbine section. Accordingly, the turbine stage durability factor can be used to identify an improved design of a combustion section and turbine section with a clocking arrangement for the plurality of stator vanes of the turbine section relative to the combustion section capable of reducing a temperature of the suction side of each of the plurality of stator vanes such that cooling requirements are decreased.

The turbine stage durability factor $\tau$ is defined as follows:

$$\tau = \frac{1}{\Lambda_s + 20 \cdot \left[\left(1 - \frac{[0.7\Lambda_p + 0.3\Lambda_s]}{4}\right) \cdot \sin(\alpha_{te}) - 0.00025 \cdot R_{b\_mid} \cdot \Omega\right]^2} \quad (1)$$

Generally, the turbine stage durability factor $\tau$ measures the durability of the first stage 255A due to clocking of the plurality of stator vanes 68 of the first stage 255A. The turbine stage durability factor $\tau$ is a dimensionless quantity that relates a clocking pitch fraction $\theta_C$ of the plurality of stator vanes 68, a midspan radius $R_{b\_mid}$ of the plurality of rotor blades 70, a rotor speed $\Omega$ of the plurality of rotor blades 70, and a vane exit angle $\alpha_{te}$ of the plurality of stator vanes 68. The rotor speed $\Omega$ of the plurality of rotor blades 70 may be determined while the engine 10 is operating at a rated speed during standard day operating conditions. The suction side heat load $\kappa_S$ and the pressure side heat load $\Lambda_P$ are based on the clocking pitch fraction $\theta_C$ of the plurality of stator vanes 68, as discussed below with respect to (2)-(3). The turbine stage durability factor $\tau$ is greater than or equal to 0.2 and less than or equal to 0.7. More specifically, the turbine stage durability factor $\tau$ may be greater than or equal to 0.2 and less than or equal to 0.5.

The turbine stage durability factor t takes into account a negative jet momentum NJM based on a wake generated by the plurality of stator vanes 68 and manifested in the plurality of rotor blades 70. The negative jet momentum NJM indicates an impact of wake temperature on the plurality of stator vanes 68 and the plurality of rotor blades 70.

For example, a lower wake temperature results in a stronger the negative jet momentum NJM, which increases the heat loads on the plurality of rotor blades 70. Accordingly, the turbine stage durability factor t is also expressed according to (1.1) as follows:

$$\tau = \frac{1}{\Lambda_s + 10(NJM)} \quad (1.1)$$

The negative jet momentum NJM is based on a vane wake temperature difference $\Delta T_w$, the vane exit angle are of the plurality of stator vanes 68, and the midspan radius $R_{b\_mid}$ of the plurality of rotor blades 70. The vane wake temperature difference $\Delta T_W$ is based on the suction side heat load $\Lambda_S$ of the suction side 320 of the plurality of stator vanes 68 and the pressure side heat load $\Lambda_P$ of the pressure side 315 of the plurality of stator vanes 68. The vane wake temperature difference $\Delta T_W$ may be measured in degrees Rankine or degrees Kelvin. The negative jet momentum NJM is defined as follows:

$$NJM = 2[\Delta T_w \cdot \sin\alpha_{te} - 0.00025 \cdot R_{b-mid} \cdot \Omega]^2 \quad (1.2)$$

The vane wake temperature difference $\Delta T_w$ is a quantity relating the suction side heat load $\Lambda_S$ of the suction side 320 of the plurality of stator vanes 68, the pressure side heat load $\Lambda_P$ of the pressure side 315 of the plurality of stator vanes 68, and the clocking pitch fraction $\theta_C$. The vane wake temperature difference $\Delta T_w$ is determined by subtracting a value from 1. The vane wake temperature difference $\Delta T_w$ is defined according to (1.3) as follows:

$$\Delta T_w = 1 - \frac{[0.7\Lambda_p + 0.3\Lambda_s]}{4} \quad (1.3)$$

The value of (1.3) is determined by dividing a sum of a first quotient and second quotient by 4 and subtracting the result from 1. The first quotient of (1.3) is determined by multiplying 0.7 times the pressure side heat load factor $\Lambda_P$. The second quotient of (1.3) is determined by multiplying 0.3 times the suction side heat load factor $\Lambda_S$. Multiplying the pressure side heat load factor $\Lambda_P$ by 0.7 represents 70% of a total cooling flow allocated to the pressure side 315 and multiplying the suction side heat load factor $\Lambda_S$ by 0.3 represents 30% of the total cooling flow that is allocated to the pressure side 315 of the plurality of stator vanes 68 (FIGS. 3A-4D). However, it should be understood that the allocation of the total cooling flow to the pressure side 315 and the suction side 320 may be variable. For example, the allocation of the total cooling flow to the pressure side 315 may be less than or greater than 70% and the allocation of the total cooling flow to the suction side 320 may be adjusted accordingly.

With reference to Expressions (1.2) and (1.3), the negative jet momentum NJM is re-rewritten according to (1.4) as follows:

$$NJM = 2\left[\left(1 - \frac{[0.7\Lambda_p + 0.3\Lambda_s]}{4}\right) \cdot \sin\alpha_{te} - 0.00025 \cdot R_{b_{mid}} \cdot \Omega\right]^2 \quad (1.4)$$

The suction side heat load factor $\Lambda_S$ defined in (1)-(1.4) describes a heat load of the suction side 320 of the plurality of stator vanes 68 based on the clocking pitch fraction $\theta_C$. The clocking pitch fraction $\theta_C$ is the clocking pitch fraction 386, as shown in FIGS. 3A-3B. Moreover, the suction side heat load $\Lambda_S$ and the clocking pitch fraction $\theta_C$ are based on the arrangement of the turbine section 27. For example, for the turbine section 27 arranged in the 1:1 relationship shown and described with respect to FIGS. 3A-3B, and the suction side heat load factor $\Lambda_S$ is defined as follows:

$$\Lambda_s = 0.5(1 - \cos(2\pi(\theta_c + 0.125))) \quad (2)$$

The pressure side heat load $\Lambda_P$ defined in (1)-(1.4) describes a heat load of the pressure side 315 of the plurality of stator vanes 68 based on the clocking pitch fraction $\theta_C$. The clocking pitch fraction $\theta_C$ is the clocking pitch fraction 386, as shown in FIGS. 3A-3B. Like the suction side heat load $\Lambda_S$ defined in (2), the pressure side heat load factor $\Lambda_P$ is based on the turbine section 27 arranged in the 1:1 relationship shown and described with respect to FIGS. 3A-3B, and the pressure side heat load factor $\Lambda_P$ is defined as follows:

$$\Lambda_p = 0.5(1 - \cos(2\pi(\theta_c - 0.125))) \quad (3)$$

The clocking pitch fraction $\theta_C$ defined in Expression (1)-(3) for the 1:1 relationship of the turbine section 27 is greater than or equal to 0.52 times the fuel nozzle pitch 330 and less than or equal to 0.8 times the fuel nozzle pitch 330. More specifically, the clocking pitch fraction $\theta_C$ defined in Expression (1)-(3) may be 0.65 times the fuel nozzle pitch 330.

Moreover, a clocking angle $\theta_n$ of the plurality of stator vanes 68 is defined relative to the fuel nozzle centerline 325. The clocking angle $\theta_n$ is based on the clocking pitch fraction $\theta_C$ and a peak temperature angle $\theta_f$. The clocking angle $\theta_n$ of the plurality of stator vanes 68 is the clocking angle 380, and the peak temperature angle $\theta_f$ is the peak temperature angle 384 described with respect to FIGS. 3A-3B. The clocking angle $\theta_n$ is defined as:

$$\theta_n = \theta_f - \theta_C \quad (4)$$

The peak temperature angle $\theta_f$ defined in Expression (4) is greater than or equal to zero (0) and less than or equal to 0.4 times the fuel nozzle pitch 330, as described with respect to FIGS. 3A-3B. Accordingly, the clocking pitch fraction $\theta_C$ and the peak temperature angle $\theta_f$ may provide the clocking angle $\theta_n$ of the plurality of stator vanes 68 for determining the clocking angle 380 of the plurality of stator vanes 68 relative to the fuel nozzle centerline 325.

Moreover, the turbine section 27 may be arranged in the 1:2 relationship as shown and described with respect to FIGS. 4A-4D. In such embodiments, a leading vane turbine stage durability factor $\tau_{LV}$ is determined for the trailing vane 402 and a trailing vane turbine stage durability factor $\tau_{TV}$ is determined for the leading vane 401. The turbine stage durability factor t is determined by taking the maximum of the leading vane turbine stage durability factor TLV and trailing vane turbine stage durability factor $\tau_{TV}$. Accordingly, the turbine stage durability factor τ for the turbine section 27 having the 1:2 arrangement is defined as follows:

$$\tau = \max(\tau_{LV}, \tau_{TV}) \tag{5}$$

The leading vane turbine stage durability factor TLV relates a leading vane wake temperature difference $\Delta_{TL}$ based on a leading vane suction side heat load $\Lambda_{LS}$ of the suction side 320 of the leading vane 401 and a leading vane pressure side heat load $\Lambda_{LP}$ of the pressure side 315 of the trailing vane 401. Similarly, the trailing vane turbine stage durability factor $\tau_{TV}$ relates a trailing vane wake temperature difference $\Delta_{TT}$ based on a trailing vane suction side heat load $\Lambda_{TS}$ of the suction side 320 of the trailing vane 402 and a trailing vane pressure side heat load $\Lambda_{TP}$ of the pressure side 315 of the trailing vane 402.

Additionally, the leading vane turbine stage durability factor TLV and the trailing vane turbine stage durability factor $\tau_{TV}$ relate the midspan radius $R_{b\_mid}$ of the plurality of rotor blades 70, the rotor speed Ω of the plurality of rotor blades 70, and the vane exit angle $\alpha_{te}$ of the plurality of stator vanes 68, as discussed with respect to equation (1) above. Accordingly, the turbine stage durability factor τ defined in (1) may be rewritten for the leading vane turbine stage durability factor TLV and the trailing vane turbine stage durability factor $\tau_{TV}$ as defined in (6.1) and (6.2) as follows:

$$\tau_{LV} = \frac{1}{\Lambda_{LS} + 20 \cdot \left[\left(1 - \frac{[0.7\Lambda_{LP} + 0.3\Lambda_{Ls}]}{4}\right) \cdot \sin\alpha_{fe} - 0.00025 \cdot R_{b-mid} \cdot \Omega\right]^2} \tag{6.1}$$

$$\tau_{TV} = \frac{1}{\Lambda_{TS} + 20 \cdot \left[\left(1 - \frac{[0.7\Lambda_{TP} + 0.3\Lambda_{Ts}]}{4}\right) \cdot \sin\alpha_{te} - 0.00025 \cdot R_{b-mid} \cdot \Omega\right]^2} \tag{6.2}$$

The leading vane turbine stage durability factor TLV and the trailing vane turbine stage durability factor $\tau_{TV}$ may also take into account the negative jet momentum NJM, as discussed with respect to Expressions (1)-(1.4) and more particularly a leading vane negative jet momentum $NJM_L$ and a trailing vane negative jet momentum $NJM_T$. Accordingly, the leading vane turbine stage durability factor $\tau_{LV}$ and the trailing vane turbine stage durability factor $\tau_{TV}$ are also expressed according to (6.3) and (6.4), respectively, as follows:

$$\tau_{LV} = \frac{1}{\Lambda_{LS} + 10 \cdot NJM_L} \tag{6.3}$$

$$\tau_{TV} = \frac{1}{\Lambda_{TS} + 10 \cdot NJM_T} \tag{6.4}$$

The leading vane negative jet momentum $NJM_L$ and the trailing vane negative jet momentum $NJM_T$ are based on the vane wake temperature difference $\Delta T_w$ discussed with respect to Expression (1.3), and more particularly a leading vane wake temperature difference $\Delta T_{WL}$ and a trailing vane wake temperature difference $\Delta T_{WT}$. The leading vane wake temperature difference $\Delta T_{WL}$ and the trailing vane wake temperature difference $\Delta T_{WT}$ are based the clocking pitch fraction $\theta_C$. The clocking pitch fraction $\theta_C$ is defined by the clocking pitch fraction 486 for the 1:2 relationship of the turbine section 27, as discussed with respect to FIGS. 4A-4D. Accordingly, the vane wake temperature difference $\Delta T_W$ may be re-written for the leading vane wake temperature difference $\Delta T_{WL}$ and the trailing vane wake temperature difference $\Delta T_{WT}$ as follows:

$$\Delta T_{WL} = 1 - \frac{[0.7\Lambda_{LP} + 0.3\Lambda_{Ls}]}{4} \tag{6.5}$$

$$\Delta T_{WT} = 1 - \frac{[0.7\Lambda_{TP} + 0.3\Lambda_{Ts}]}{4} \tag{6.6}$$

Moreover, the leading vane negative jet momentum $NJM_L$ and the trailing vane negative jet momentum $NJM_T$ may be re-written as follows:

$$NJM_L = 2\left[\left(1 - \frac{[0.7\Lambda_{LP} + 0.3\Lambda_{Ls}]}{4}\right) \cdot \sin\alpha_{te} - 0.00025 \cdot R_{b-mid} \cdot \Omega\right]^2 \tag{6.7}$$

$$NJM_T = 2\left[\left(1 - \frac{[0.7\Lambda_{TP} + 0.3\Lambda_{Ts}]}{4}\right) \cdot \sin\alpha_{fe} - 0.00025 \cdot R_{b-mid} \cdot \Omega\right]^2 \tag{6.8}$$

The suction side heat load $\Lambda_S$ and the pressure side heat load $\Lambda_P$ may be rewritten for the leading vane suction side heat load $\Lambda_{LS}$, the leading vane pressure side heat load $\Lambda_{LP}$, the trailing vane suction side heat load $\Lambda_{TS}$, and the trailing vane pressure side heat load $\Lambda_{TP}$ defined in (2)-(3) as follows:

$$\Lambda_{LS} = 0.5(1 - \cos(2\pi(\theta_c + 0.83))) \tag{7}$$

$$\Lambda_{LP} = 0.5(1 - \cos(2\pi(\theta_c + 0.67))) \tag{8}$$

$$\Lambda_{TS} = 0.5(1 - \cos(2\pi(\theta_c + 0.33))) \tag{9}$$

$$\Lambda_{TP} = 0.5(1 - \cos(2\pi(\theta_c + 0.17))) \tag{10}$$

When the turbine section 27 is arranged in the 1:2 relationship shown and described with respect to FIGS. 4A-4D, the clocking pitch fraction $\theta_C$ defined in Expressions (7)-(10) relative to the leading vane 401 is greater than or equal to 0.77 times the fuel nozzle pitch 330 and less than or equal to 0.95 times the fuel nozzle pitch 330 in degrees. For example, the clocking pitch fraction $\theta_C$ defined in Expressions (7)-(10) relative to the leading vane 401 may be 0.85 times the fuel nozzle pitch 330 in degrees. Additionally, when the turbine section 27 is arranged in the 1:2 relationship shown and described with respect to FIGS. 4A-4D, the clocking pitch fraction $\theta_C$ defined in (7)-(10) relative to the trailing vane 402 is greater than or equal to 0.28 times the fuel nozzle pitch 330 and less than or equal to 0.45 times the fuel nozzle pitch 330 in degrees. For example, the clocking pitch fraction $\theta_C$ defined in Expressions (7)-(10) relative to the trailing vane 402 may be 0.35 times the fuel nozzle pitch 330 in degrees.

Moreover, the clocking angle $\theta_n$ of the plurality of stator vanes 68 in the 1:2 relationship is defined relative to the fuel nozzle centerline 325. $\Lambda_S$ discussed above, the clocking angle $\theta_n$ is based on the clocking pitch fraction $\theta_C$ and the peak temperature angle $\theta_f$. The clocking angle $\theta_n$ of the plurality of stator vanes 68 is the clocking angle 480, and the peak temperature angle $\theta_f$ is the peak temperature angle 484 described with respect to FIGS. 3A-3B. The clocking angle $\theta_n$ is defined as:

$$\theta_n = \theta_f - \theta_c \tag{11}$$

When the turbine section 27 is arranged in the 1:2 relationship shown and described with respect to FIGS. 4A-4D, the peak temperature angle $\theta_f$ is greater than or equal to 0 and less than or equal to 0.4 times the fuel nozzle pitch 330 in degrees. Accordingly, the clocking pitch fraction $\theta_C$ and the peak temperature angle $\theta_f$ are used to provide the clocking angle $\theta_n$ of the plurality of stator vanes 68, which can then be used to determine the clocking angle 480 of the plurality of stator vanes 68 relative to the fuel nozzle centerline 325.

The vane exit angle $\alpha_{te}$ of (1), (1.2), (1.4), (6.1), (6.2), (6.7), and (6.8) is the vane exit angle 340. Accordingly, the vane exit angle die of (1), (1.2), (1.4), (6.1), (6.2), (6.7), and (6.8) is greater than or equal to 65° and less than or equal to 80°.

Moreover, the midspan radius $R_{b\_mid}$ of (1), (1.2), (1.4), (6.1), (6.2), (6.7), and (6.8) is the blade midspan radius 375 in units of feet. The rotor speed $\Omega$ of (1), (1.2), (1.4), (6.1), (6.2), (6.7), and (6.8) is a rotational speed of the plurality of rotor blades 70 in radians per second. Accordingly, the midspan radius $R_{b\_mid}$ times the rotor speed $\Omega$ of (1.2), (1.4), (6.1), (6.2), (6.7), and (6.8) is greater than or equal to 1,250 feet per second and less than or equal to 2,000 feet per second.

Values for the turbine stage durability factor $\tau$ divided by the turbine stage durability factor $\tau$ at a clocking pitch fraction $\theta_C$ equal to $$0.5\left(\frac{\tau}{\tau(\theta_c = 0.5)}\right)$$

for each of the examples of Table 1A and Table 1B are shown in Table 2A and Table 2B, respectively.

TABLE 2A

1:1 Configuration

| Parameter | $\theta_C$ (Clocking Pitch Fraction) | $\alpha_{te}$ (Vane Exit Angle) | $R_{b\_mid} \cdot \Omega$ (Midspan Radius multiplied by Rotor Speed) | $\frac{\tau}{\tau(\theta_c = 0.5)}$ (Turbine Stage Durability Factor divided by the Turbine Stage Durability Factor at $\theta_C$ = 0.5) |
|---|---|---|---|---|
| Units | n/a | degrees | ft/s | n/a |
| Ex. 1 | 0.67 | 65 | 2000 | 1.271 |
| Ex. 2 | 0.66 | 73 | 1725 | 1.127 |
| Ex. 3 | 0.62 | 65 | 1450 | 1.115 |
| Ex. 4 | 0.6 | 78 | 1650 | 1.107 |
| Ex. 5 | 0.65 | 78 | 1650 | 1.104 |
| Ex. 6 | 0.7 | 78 | 1650 | 1.057 |
| Ex. 7 | 0.52 | 65 | 2000 | 1.045 |
| Ex. 8 | 0.7 | 65 | 1250 | 1.044 |

TABLE 2A-continued

1:1 Configuration

| Parameter | $\theta_C$ (Clocking Pitch Fraction) | $\alpha_{te}$ (Vane Exit Angle) | $R_{b\_mid} \cdot \Omega$ (Midspan Radius multiplied by Rotor Speed) | $\frac{\tau}{\tau(\theta_c = 0.5)}$ (Turbine Stage Durability Factor divided by the Turbine Stage Durability Factor at $\theta_C$ = 0.5) |
|---|---|---|---|---|
| Ex. 9 | 0.52 | 80 | 2000 | 1.038 |
| Ex. 10 | 0.8 | 65 | 2000 | 1.032 |
| Ex. 11 | 0.52 | 65 | 1450 | 1.029 |
| Ex. 12 | 0.52 | 80 | 1450 | 1.026 |
| Ex. 13 | 0.51 | 80 | 1450 | 1.013 |
| Ex. 14 | 0.51 | 80 | 1250 | 1.012 |
| Ex. 15 | 0.81 | 65 | 2000 | 1.003 |
| Ex. 16 | 0.75 | 78 | 1650 | 0.975 |
| Ex. 17 | 0.8 | 80 | 2000 | 0.915 |
| Ex. 18 | 0.8 | 65 | 1450 | 0.903 |
| Ex. 19 | 0.8 | 78 | 1650 | 0.877 |
| Ex. 20 | 0.8 | 80 | 1450 | 0.865 |

TABLE 2B

1:2 Configuration

| Parameter | Arrange-ment | $\theta_C$ (Clocking Pitch Fraction) | $\alpha_{te}$ (Vane Exit Angle) | $R_{b\_mid} \cdot \Omega$ (Midspan Radius multiplied by Rotor Speed) | $\frac{\tau}{\tau(\theta_c = 0.5)}$ (Turbine Stage Durability Factor divided by the Turbine Stage Durability Factor at $\theta_C$ = 0.5) |
|---|---|---|---|---|---|
| Units | n/a | n/a | degrees | ft/s | n/a |
| Ex. 1 | 1:2 LV | 0.32 | 80 | 1450 | 1.238778 |
| Ex. 2 | 1:2 LV | 0.3 | 78 | 1650 | 1.230176 |
| Ex. 3 | 1:2 TV | 0.8 | 78 | 1650 | 1.230176 |
| Ex. 4 | 1:2 LV | 0.35 | 80 | 2000 | 1.228886 |
| Ex. 5 | 1:2 TV | 0.85 | 80 | 2000 | 1.228886 |
| Ex. 6 | 1:2 LV | 0.28 | 80 | 1450 | 1.223179 |
| Ex. 7 | 1:2 TV | 0.86 | 72.5 | 1725 | 1.22016 |
| Ex. 8 | 1:2 TV | 0.77 | 80 | 1450 | 1.215202 |
| Ex. 9 | 1:2 LV | 0.37 | 72.5 | 1725 | 1.215077 |
| Ex. 10 | 1:2 TV | 0.88 | 80 | 1450 | 1.208884 |
| Ex. 11 | 1:2 LV | 0.35 | 65 | 1250 | 1.202743 |
| Ex. 12 | 1:2 TV | 0.85 | 65 | 1250 | 1.202743 |
| Ex. 13 | 1:2 LV | 0.4 | 78 | 1650 | 1.192209 |
| Ex. 14 | 1:2 TV | 0.9 | 78 | 1650 | 1.192209 |
| Ex. 15 | 1:2 LV | 0.28 | 80 | 2000 | 1.184114 |
| Ex. 16 | 1:2 LV | 0.28 | 65 | 1450 | 1.180633 |
| Ex. 17 | 1:2 TV | 0.77 | 80 | 2000 | 1.171358 |
| Ex. 18 | 1:2 TV | 0.77 | 65 | 1450 | 1.171321 |
| Ex. 19 | 1:2 LV | 0.45 | 80 | 2000 | 1.117311 |
| Ex. 20 | 1:2 TV | 0.95 | 80 | 2000 | 1.117311 |
| Ex. 21 | 1:2 LV | 0.45 | 80 | 1450 | 1.102389 |
| Ex. 22 | 1:2 TV | 0.95 | 80 | 1450 | 1.102389 |
| Ex. 23 | 1:2 LV | 0.45 | 65 | 2000 | 1.099438 |
| Ex. 24 | 1:2 TV | 0.95 | 65 | 2000 | 1.099438 |
| Ex. 25 | 1:2 LV | 0.45 | 65 | 1450 | 1.097344 |
| Ex. 26 | 1:2 TV | 0.95 | 65 | 1450 | 1.097344 |
| Ex. 27 | 1:2 LV | 0.28 | 65 | 2000 | 1.069197 |
| Ex. 28 | 1:2 TV | 0.77 | 65 | 2000 | 1.054754 |
| Ex. 29 | 1:2 LV | 0.48 | 65 | 1250 | 1.038428 |
| Ex. 30 | 1:2 TV | 0.65 | 65 | 1250 | 1.013384 |

Based on values of the turbine stage durability factor τ divided by the turbine stage durability factor τ at a clocking pitch fraction $\theta_C$ equal to 0.5 of Examples 1-20 in Table 2A and Examples 1-30 of Table 2B, it was determined that gas turbine engine designs with values of t divided by the turbine stage durability factor τ at a clocking pitch fraction $\theta_C$ equal to 0.5 greater than or equal to 1.003 and less than or equal to 1.271 (i.e., $$1.003 \le \frac{\tau}{\tau(\theta_c = 0.5)} \le 1.271\Big)$$

advantageously meet the durability requirements while remaining within desired tolerances and being capable of use in existing engine systems.

Table 3 below illustrates minimum and maximum values for the clocking pitch fraction θC, the vane exit angle $\alpha_{te}$, and the midspan radius $R_{b\_mid}$ multiplied by the rotor speed Ω ($R_{b\_mid} \cdot \Omega$) along with a range of values for the turbine stage durability factor τ divided by the turbine stage durability factor τ at a clocking pitch fraction $\theta_C$ equal suited for a $$\text{to } 0.5\left(\frac{\tau}{\tau(\theta_c = 0.5)}\right)$$

suited for a combustion section and turbine section that increases durability of a plurality of stator vanes and a plurality of rotor blades and reduces cooling requirements. Values above or below the ranges provided herein result in a non-optimal aerodynamic design which may negatively impact the operation and efficiency of turbine engines.

TABLE 3

| Parameter: | Element: | Arrangement: | Minimum: | Maximum: | Units: |
|---|---|---|---|---|---|
| $\theta_C$ | Clocking Pitch Fraction | 1:1 | 0.51 | 0.81 | degrees |
| | | 1:2 LV | 0.77 | 0.95 | |
| | | 1:2 TV | 0.28 | 0.45 | |
| $\alpha_{te}$ | Vane Exit Angle | 1:1 | 65 | 80 | degrees |
| | | 1:2 LV | 65 | 80 | |
| | | 1:2 TV | 65 | 80 | |
| $R_{b\_mid} \cdot \Omega$ | Midspan Radius multiplied by Rotor Speed | 1:1 | 1250 | 2000 | feet per second |
| | | 1:2 LV | 1250 | 2000 | |
| | | 1:2 TV | 1250 | 2000 | |
| $\frac{\tau}{\tau(\theta_c = 0.5)}$ | Turbine Stage Durability Factor divided by the Turbine Stage Durability Factor at $\theta_C = 0.5$ | 1:1 | 1.003 | 1.271 | n/a |
| | | 1:2 LV | 1.003 | 1.271 | |
| | | 1:2 TV | 1.003 | 1.271 | |

Additional benefits associated with the gas turbine engine, including the arrangement of the plurality of stator vanes 68 and the plurality of rotor blades 70, described herein include a quick assessment of design parameters in terms of vane and blade arrangement and engine operational conditions for engine design and particular blade and vane design. Narrowing these multiple factors to a region of possibilities saves time, money, and resources. The arrangement of the plurality of stator vanes 68 and the plurality of rotor blades 70 described herein enables the development and production of high-performance turbine engines across multiple performance metrics within a given set of constraints.

As noted above, designs such as Examples 16-20 of Table 1A were found to have relatively low durability for a particular engine environment. This is reflected in the associated value for the turbine stage durability factor τ divided by the turbine stage durability factor τ at a clocking pitch fraction $\theta_C$ equal to $$0.5\left(\frac{\tau}{\tau(\theta_c = 0.5)}\right)$$

not being greater than or equal to 1.003 and less than or equal to 1.271 (i.e., $$1.003 \le \frac{\tau}{\tau(\theta_c = 0.5)} \le 1.271\Big).$$

As disclosed above, the inventors have found that the Examples 1-15 of Tables 1A and 2A and Examples 1-30 of Tables 1B and 2B provide successful solutions without the need to increase cooling requirements. The Examples 1-15 of Tables 1A and 2A and Examples 1-30 of Tables 1B and 2B illustrate that designs having a turbine stage durability factor τ divided by the turbine stage durability factor τ at a clocking pitch fraction $\theta_C$ equal to $$0.5\left(\frac{\tau}{\tau(\theta_c = 0.5)}\right)$$

value greater than or equal to 1.003 and less than or equal to 1.271 (i.e., $$1.003 \le \frac{\tau}{\tau(\theta_c = 0.5)} \le 1.271\Big)$$

achieve increased durability without the use of additional cooling features.

Figure 6:
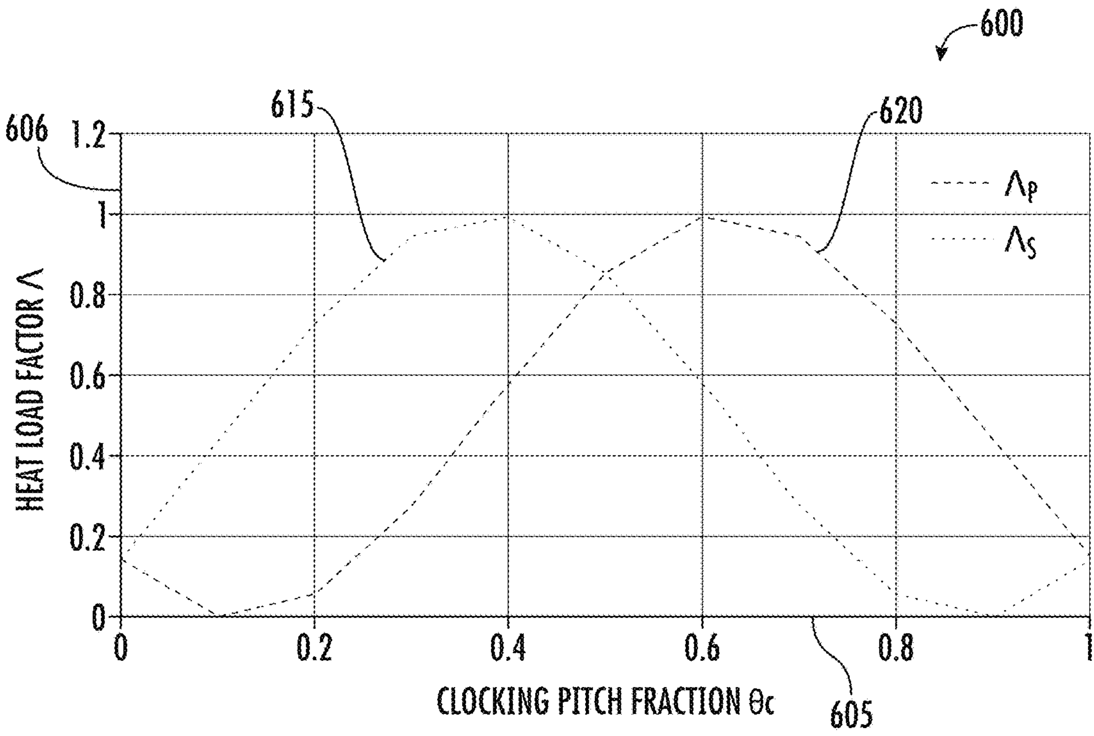
FIG. 6 is a graphical representation of a heat load factor relative to a clocking position according to an exemplary embodiment of the present disclosure.

FIG. 6 is a graphical representation of a heat load factor relative to a clocking position according to an exemplary embodiment of the present disclosure. More particularly, FIG. 6 provides a graph 600 depicting the suction side heat load $\Lambda_S$ of the suction side 320 of the plurality of stator vanes 68 and the pressure side heat load $\Lambda_P$ of the pressure side 315 of the plurality of stator vanes 68 as a function of the clocking pitch fraction $\theta_C$ of the plurality of stator vanes 68 for the turbine section 27 having the 1:1 relationship discussed with respect to FIGS. 3A-3B.

For example, the graph 600 provides the clocking pitch fraction $\theta_C$ on the X-axis 605 and the suction side heat load $\Lambda_S$ and the pressure side heat load $\Lambda_P$ on the Y-axis 606. The graph 600 includes a first line 615 indicating a relationship between the suction side heat load factor $\Lambda_S$ of the suction side 320 of the plurality of stator vanes 68 and the clocking pitch fraction $\theta_C$. The graph 600 also includes a second line 620 indicating a relationship between the pressure side heat load factor $\Lambda_P$ of the pressure side 315 of the plurality of stator vanes 68 and the clocking pitch fraction $\theta_C$.

Figure 7:
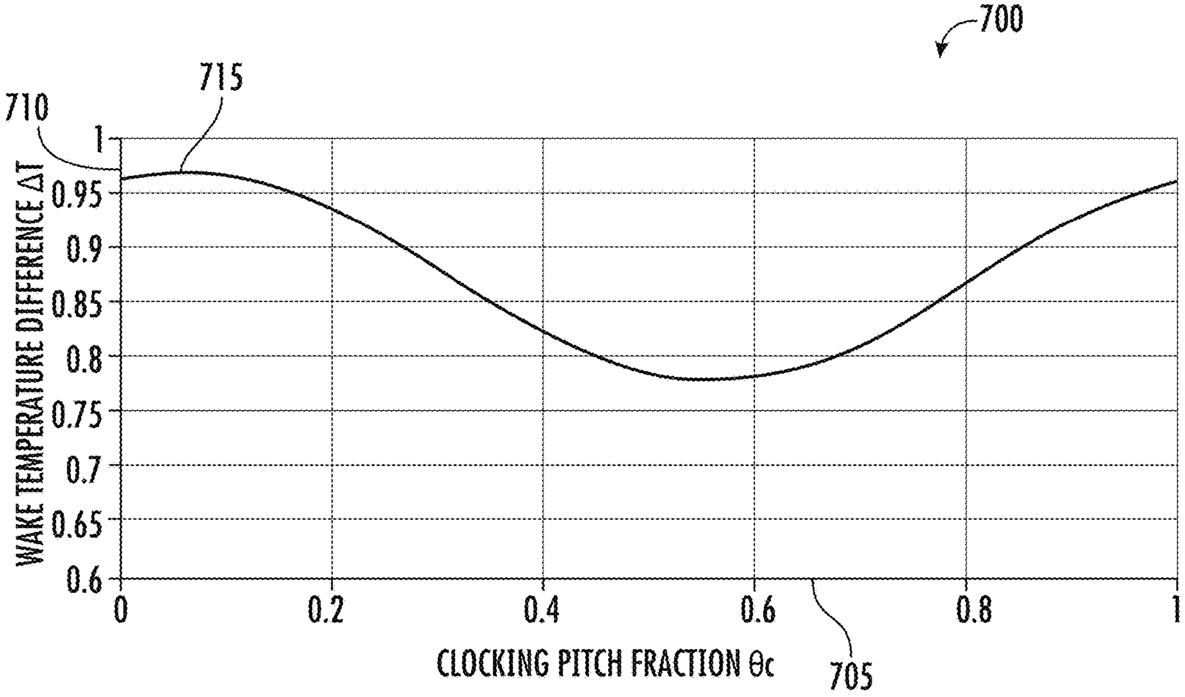
FIG. 7 is a graphical representation of a vane wake temperature difference relative to a clocking position according to an exemplary embodiment of the present disclosure.

FIG. 7 is a graphical representation of a vane wake temperature difference $\Delta_T$ relative to a clocking position according to an exemplary embodiment of the present disclosure. More particularly, FIG. 7 provides a graph 700 depicting the vane wake temperature difference $\Delta_T$ as a function of the clocking pitch fraction $\theta_C$ of the plurality of stator vanes 68 for the turbine section 27 having the 1:1 relationship discussed with respect to FIGS. 3A-3B.

For example, the graph 700 provides the clocking pitch fraction $\theta_C$ on the X-axis 705 and the vane wake temperature difference $\Delta_T$ on the Y-axis 710. The graph 700 includes a line 715 indicating a relationship between the vane wake temperature difference $\Delta_T$ of the plurality of stator vanes 68 and the clocking pitch fraction $\theta_C$.

Figure 8:
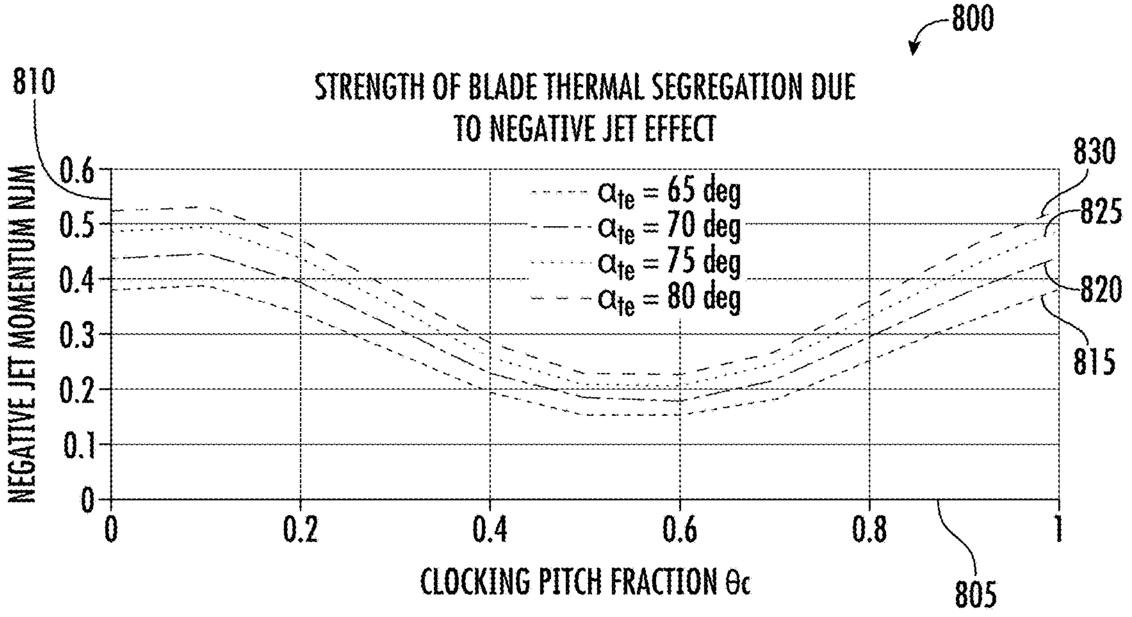
FIG. 8 is a graphical representation of a negative jet momentum relative to a clocking position according to an exemplary embodiment of the present disclosure.

FIG. 8 is a graphical representation of a negative jet momentum relative to a clocking position according to an exemplary embodiment of the present disclosure. More particularly, FIG. 8 provides a graph 800 depicting the negative jet momentum NJM as a function of the clocking pitch fraction $\theta_C$ of the plurality of stator vanes 68 for the turbine section 27 having the 1:1 relationship discussed with respect to FIGS. 3A-3B.

For example, the graph 800 provides the clocking pitch fraction $\theta_C$ on the X-axis 805 and the negative jet momentum NJM on the Y-axis 810. The graph 800 includes a first line 815 indicating a relationship between the negative jet momentum NJM and the clocking pitch fraction $\theta_C$ where the vane exit angle die is 65°. The graph 800 includes a second line 820 indicating a relationship between the negative jet momentum NJM and the clocking pitch fraction $\theta_C$ where the vane exit angle $\alpha_{te}$ is 70°. The graph 800 includes a third line 825 indicating a relationship between the negative jet momentum NJM and the clocking pitch fraction $\theta_C$ where the vane exit angle $\alpha_{te}$ is 75°. The graph 800 also includes a fourth line 830 indicating a relationship between the negative jet momentum NJM and the clocking pitch fraction $\theta_C$ where the vane exit angle $\alpha_{te}$ is 80°.

Figure 9:
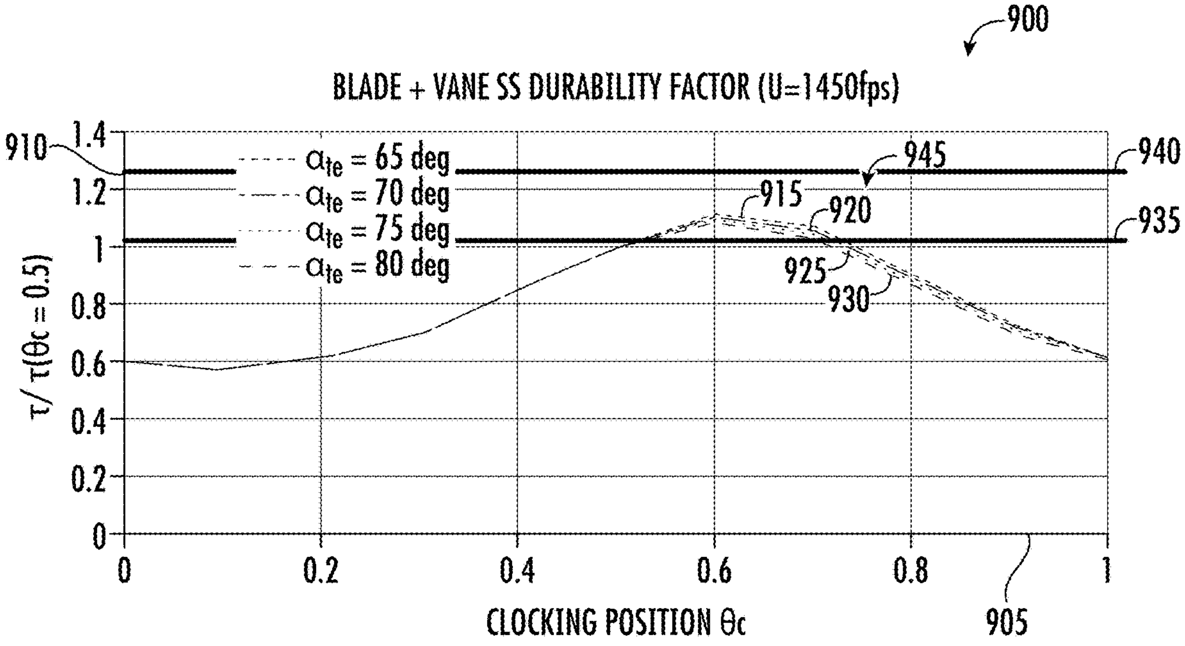
FIG. 9 is a graphical representation of a turbine stage durability factor relative to a clocking position according to an exemplary embodiment of the present disclosure.

FIG. 9 is a graphical representation of the turbine stage durability factor τ divided by the turbine stage durability factor τ at a clocking pitch fraction $\theta_C$ equal to $$0.5\left(\frac{\tau}{\tau(\theta_c = 0.5)}\right)$$

relative to the clocking pitch fraction $\theta_C$ according to an exemplary embodiment of the present disclosure. More particularly, FIG. 9 provides a graph 900 depicting $$\frac{\tau}{\tau(\theta_c = 0.5)}$$

as a function of the clocking pitch fraction $\theta_C$ where the midspan radius $R_{b\_mid}$ multiplied by the rotor speed Ω of the plurality of rotor blades 70, indicated as "U" in FIG. 9, is 1450 feet per second for the turbine section 27 having the 1:1 relationship discussed with respect to FIGS. 3A-3B.

For example, the graph 900 provides the clocking pitch fraction $\theta_C$ on the X-axis 905 and $$\frac{\tau}{\tau(\theta_c = 0.5)}$$

on the Y-axis 910. The graph 900 includes a first line 915 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle die is 65°. The graph 900 includes a second line 920 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle die is 70°. The graph 900 includes a third line 925 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle $\alpha_{te}$ is 75°. The graph 900 also includes a fourth line 930 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle $\alpha_{te}$ is 80°.

Moreover, the graph 900 depicts a lower bound 935 where $$\frac{\tau}{\tau(\theta_c = 0.5)}$$

is equal to 1.003 and an upper bound 940 where $$\frac{\tau}{\tau(\theta_c = 0.5)}$$

is equal to 1.271. Accordingly, a range 945 is defined between the lower bound 935 and the upper bound 940 such that $$\frac{\tau}{\tau(\theta_c = 0.5)}$$

is greater than or equal to 1.003 and less than or equal to 1.271. Values within the range 940 improve durability of the plurality of stator vanes 68 and the plurality of rotor blades 70, while also decreasing cooling requirements. Additionally, values below the range 940 provide a non-optimal aerodynamic design which may negatively impact the operation and efficiency of the engine 100.

Figure 10:
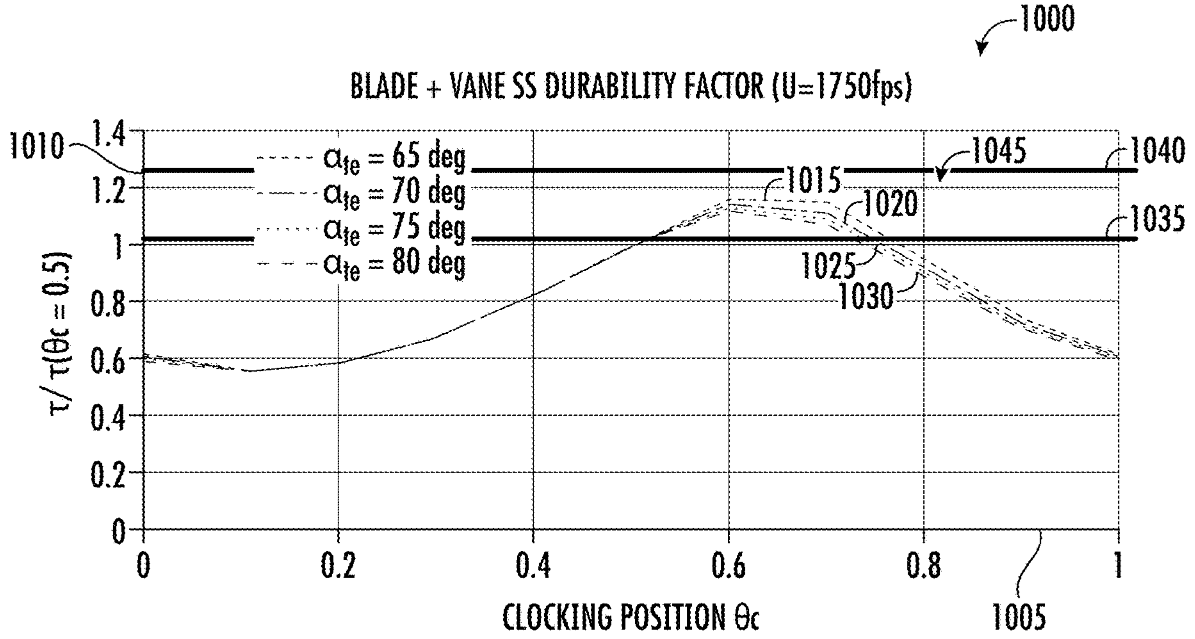
FIG. 10 is a graphical representation of a turbine stage durability factor relative to a clocking position according to an exemplary embodiment of the present disclosure.

FIG. 10 is a graphical representation of the turbine stage durability factor τ divided by the turbine stage durability factor τ at a clocking pitch fraction $\theta_C$ equal to $$0.5\left(\frac{\tau}{\tau(\theta_c = 0.5)}\right)$$

relative to the clocking pitch fraction $\theta_C$ according to an exemplary embodiment of the present disclosure. More particularly, FIG. 10 provides a graph 1000 depicting $$\frac{\tau}{\tau(\theta_c = 0.5)}$$

as a function of the clocking pitch fraction $\theta_C$ where the midspan radius $R_{b\_mid}$ multiplied by the rotor speed $\Omega$ of the plurality of rotor blades 70, indicated as "U" in FIG. 10, is 1750 feet per second for the turbine section 27 having the 1:1 relationship discussed with respect to FIGS. 3A-3B.

For example, the graph 1000 provides the clocking pitch fraction $\theta_C$ on the X-axis 1005 and $$t\frac{\tau}{\tau(\theta_c = 0.5)}$$

on the Y-axis 1010. The graph 1000 includes a first line 1015 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 65°. The graph 1000 includes a second line 1020 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle are is 70°. The graph 1000 includes a third line 1025 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 75°. The graph 1000 also includes a fourth line 1030 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 80°. Moreover, the graph 1000 depicts a lower bound 1035 where $$\frac{\tau}{\tau(\theta_c = 0.5)}$$

is equal to 1.003 and an upper bound 1040 where $$\frac{\tau}{\tau(\theta_c = 0.5)}$$

is equal to 1.271.

Accordingly, a range 1045 is defined between the lower bound 1035 and the upper bund 1040 such that $$\frac{\tau}{\tau(\theta_c = 0.5)}$$

is greater than or equal to 1.003 and less than or equal to 1.271. Values within the range 1040 improve durability of the plurality of stator vanes 68 and the plurality of rotor blades 70, while also decreasing cooling requirements. Additionally, values below the range 1040 provide a non-optimal aerodynamic design which may negatively impact the operation and efficiency of the engine 100.

Figure 11:
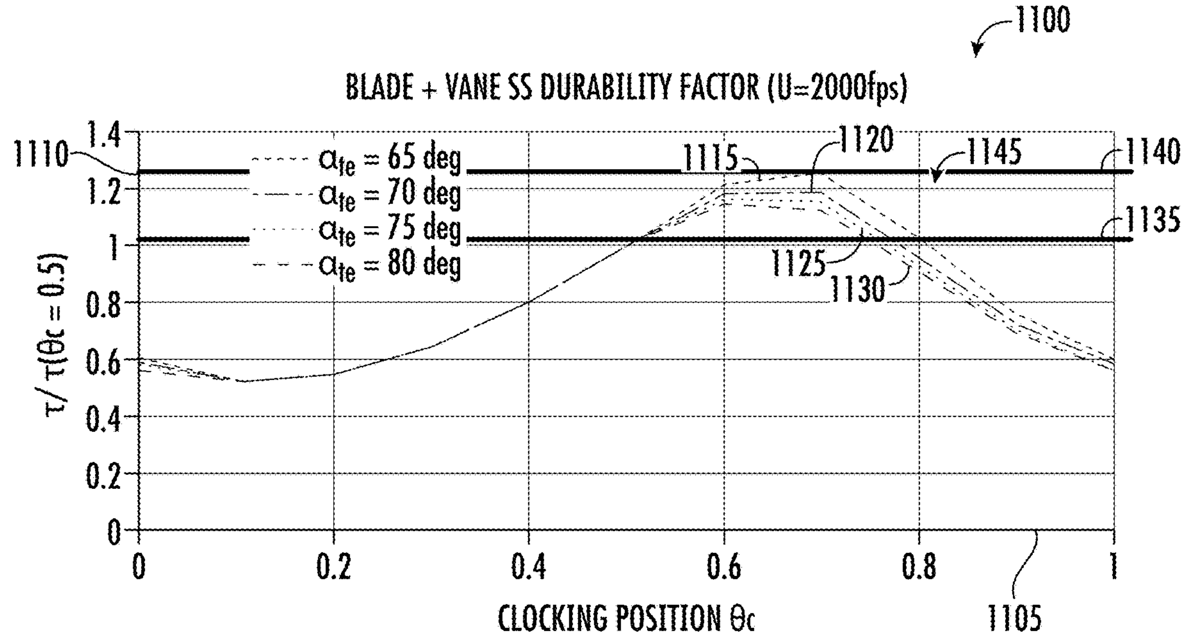
FIG. 11 is a graphical representation of a turbine stage durability factor relative to a clocking position according to an exemplary embodiment of the present disclosure.

FIG. 11 is a graphical representation of the turbine stage durability factor $\tau$ divided by the turbine stage durability factor $\tau$ at a clocking pitch fraction $\theta_C$ equal to $$0.5\left(\frac{\tau}{\tau(\theta_c = 0.5)}\right)$$

relative to the clocking pitch fraction $\theta_C$ according to an exemplary embodiment of the present disclosure. More particularly, FIG. 11 provides a graph 1100 depicting $$\frac{\tau}{\tau(\theta_c = 0.5)}$$

as a function of the clocking pitch fraction $\theta_C$ where the midspan radius $R_{b\_mid}$ multiplied by the rotor speed $\Omega$ of the plurality of rotor blades 70, indicated as "U" in FIG. 11, is 2000 feet per second for the turbine section 27 having the 1:1 relationship discussed with respect to FIGS. 3A-3B.

For example, the graph 1100 provides the clocking pitch fraction $\theta_C$ on the X-axis 1105 and $$\frac{\tau}{\tau(\theta_c = 0.5)}$$

on the Y-axis 1110. The graph 1100 includes a first line 1115 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 65°. The graph 1100 includes a second line 1120 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 70°. The graph 1100 includes a third line 1125 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 75°. The graph 1100 also includes a fourth line 1130 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 80°.

Moreover, the graph 1100 depicts a lower bound 1135 where $$\frac{\tau}{\tau(\theta_c = 0.5)}$$

is equal to 1.003 and an upper bound 1140 where $$\frac{\tau}{\tau(\theta_c = 0.5)}$$

is equal to 1.2/1. Accordingly, a range 1145 is defined between the lower bound 1135 and the upper bound 1140 such that $$\frac{\tau}{\tau(\theta_c = 0.5)}$$

is greater than or equal to 1.003 and less than or equal to 1.271. Moreover, the clocking pitch fraction $\theta_C$ is greater than or equal to 0.52 and less than or equal to 0.8 within the range 1140. Values within the range 1140 improve durability of the plurality of stator vanes 68 and the plurality of rotor blades 70, while also decreasing cooling requirements. Additionally, below the range 1140 provide a non-optimal aerodynamic design which may negatively impact the operation and efficiency of the engine 100.

Figure 12:
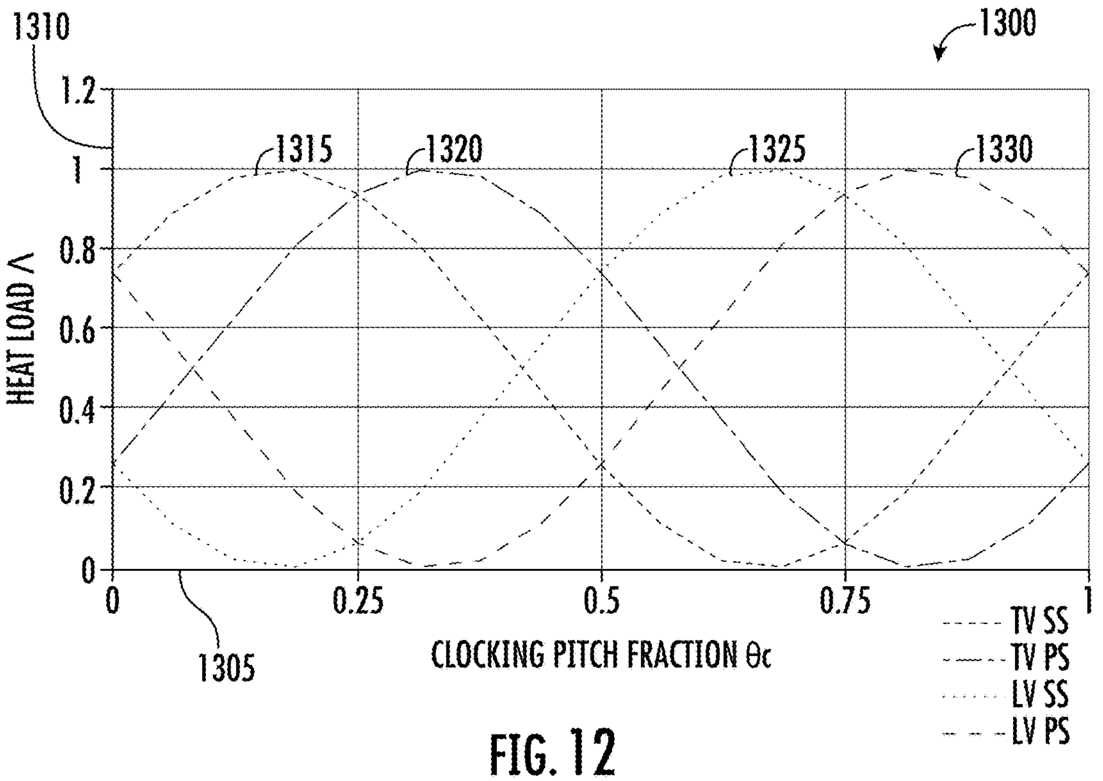
FIG. 12 provides a table listing values for various turbine airfoils durability factor characteristics for different example gas turbine engines according to exemplary embodiments of the present disclosure.

FIG. 12 is a graphical representation of a heat load factor of the pressure side 315 and the suction side 320 of the plurality of stator vanes 68 in a doublet as a function of a clocking position according to an exemplary embodiment of the present disclosure. More particularly, FIG. 12 provides a graph 1300 depicting the leading vane suction side heat load $\Lambda_{LS}$ and the leading vane pressure side heat load $\Lambda_{LP}$ of the trailing vane 402 and the trailing vane suction side heat load $\Lambda_{TS}$ and the trailing vane pressure side heat load $\Lambda_{TP}$ of the leading vane 401 as a function of the clocking pitch fraction $\theta_C$ of the plurality of stator vanes 68 for the turbine section 27 having the 1:2 relationship discussed with respect to FIGS. 4A-4D.

For example, the graph 1300 provides the clocking pitch fraction $\theta_C$ on the X-axis 1305 and the leading vane suction side heat load $\Lambda_{LS}$, the leading vane pressure side heat load $\Lambda_{LP}$, the trailing vane suction side heat load Ars, and the trailing vane pressure side heat load $\Lambda_{TP}$ on the Y-axis 1310. The graph 1300 includes a first line 1315 indicating a relationship between the trailing vane suction side heat load $\Lambda_{TS}$ of the leading vane 401 and the clocking pitch fraction $\theta_C$. The graph 1300 includes a second line 1320 indicating a relationship between the trailing vane pressure side heat load $\Lambda_{TP}$ of the leading vane 401 and the clocking pitch fraction $\theta_C$. The graph 1300 includes a third line 1325 indicating a relationship between the leading vane suction side heat load $\Lambda_{LS}$ of the trailing vane 402 and the clocking pitch fraction $\theta_C$. The graph 1300 also includes a fourth line 1330 indicating a relationship between the leading vane pressure side heat load $\Lambda_{LP}$ of the trailing vane 402 and the clocking pitch fraction $\theta_C$.

Figure 13:
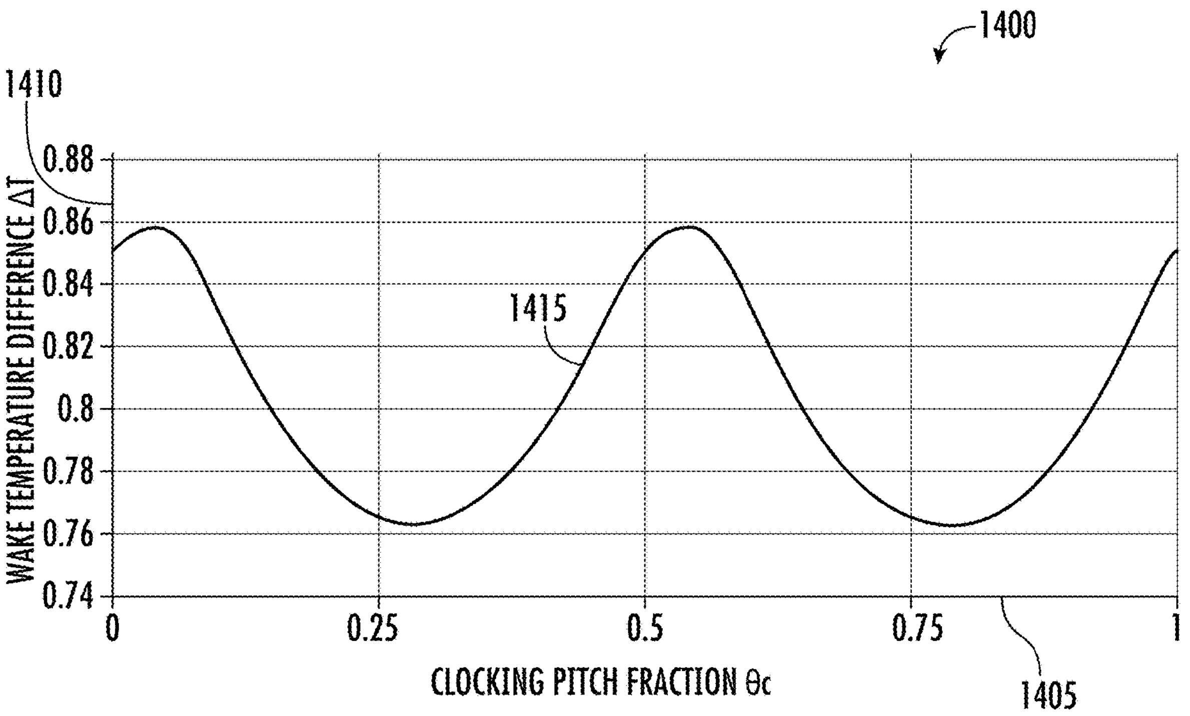
FIG. 13 is a graphical representation of a heat load factor relative to a clocking position according to an exemplary embodiment of the present disclosure.

FIG. 13 is a graphical representation of a vane wake temperature difference relative to a clocking position according to an exemplary embodiment of the present disclosure. More particularly, FIG. 13 provides a graph 1400 depicting the vane wake temperature difference $\Delta_T$, such as the leading vane wake temperature difference $\Delta_{TL}$ and the trailing vane wake temperature difference $\Delta_{TT}$, as a function of the clocking pitch fraction $\theta_C$ of the plurality of stator vanes 68 for the turbine section 27 having the 1:2 relationship discussed with respect to FIGS. 4A-4D.

For example, the graph 1400 provides the clocking pitch fraction $\theta_C$ on the X-axis 1405 and the vane wake temperature difference $\Delta_T$ on the Y-axis 1410. The graph 1400 includes a line 1415 indicating a relationship between the vane wake temperature difference $\Delta_T$ of the plurality of stator vanes 68 and the clocking pitch fraction $\theta_C$.

Figure 14:
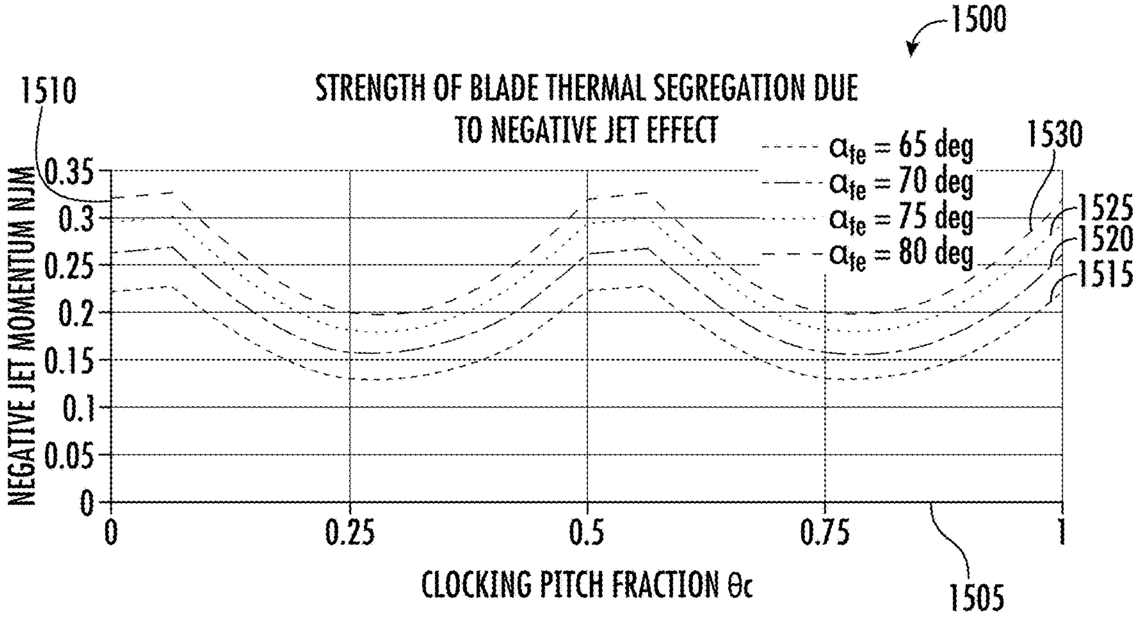
FIG. 14 is a graphical representation of a wake delta-T relative to a clocking position according to an exemplary embodiment of the present disclosure.

FIG. 14 is a graphical representation of a negative jet momentum relative to a clocking position according to an exemplary embodiment of the present disclosure. More particularly, FIG. 14 provides a graph 1500 depicting the negative jet momentum NJM as a function of the clocking pitch fraction $\theta_C$ of the plurality of stator vanes 68 for the turbine section 27 having the 1:2 relationship discussed with respect to FIGS. 4A-4D.

For example, the graph 1500 provides the clocking pitch fraction $\theta_C$ on the X-axis 1505 and the negative jet momentum NJM on the Y-axis 1510. The graph 1500 includes a first line 1515 indicating a relationship between the negative jet momentum NJM and the clocking pitch fraction $\theta_C$ where the vane exit angle $\alpha_{te}$ is 65°. The graph 1500 includes a second line 1520 indicating a relationship between the negative jet momentum NJM and the clocking pitch fraction $\theta_C$ where the vane exit angle $\alpha_{te}$ is 70°. The graph 1500 includes a third line 1525 indicating a relationship between the negative jet momentum NJM and the clocking pitch fraction $\theta_C$ where the vane exit angle are is 75°. The graph 1500 also includes a fourth line 1530 indicating a relationship between the negative jet momentum NJM and the clocking pitch fraction $\theta_C$ where the vane exit angle $\alpha_{te}$ is 80°.

Figure 15:
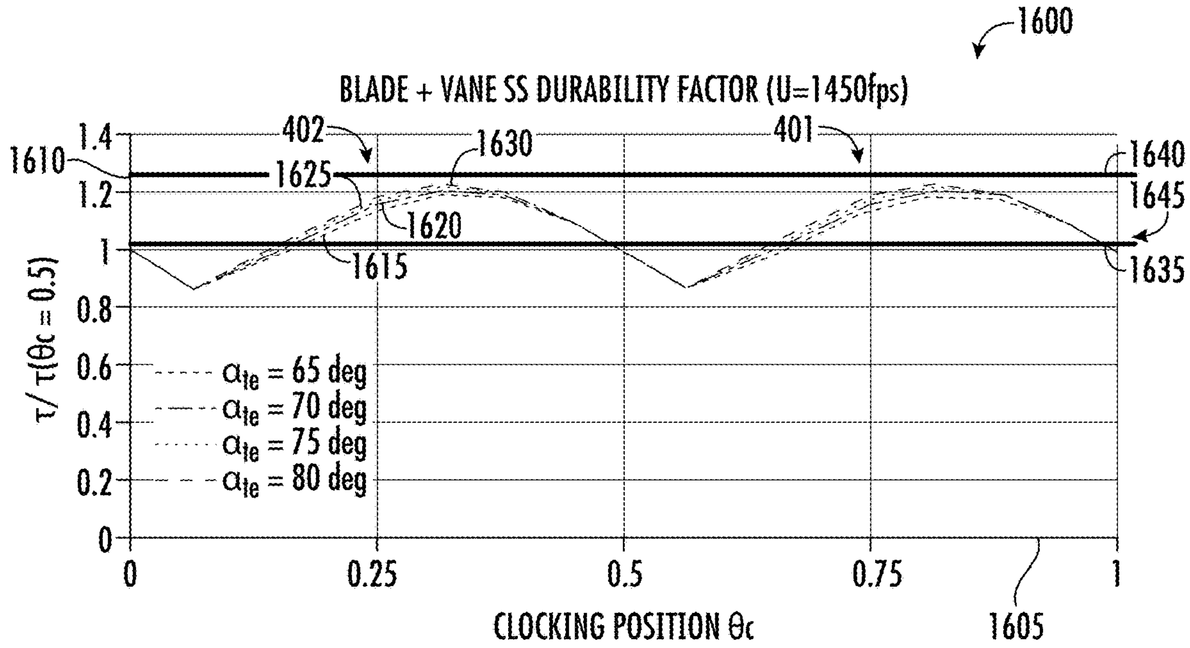
FIG. 15 is a graphical representation of a negative jet momentum relative to a clocking position according to an exemplary embodiment of the present disclosure.

FIG. 15 is a graphical representation of the turbine stage durability factor $\tau$ divided by the turbine stage durability factor $\tau$ at a clocking pitch fraction $\theta_C$ equal to $$0.5\left(\frac{\tau}{\tau(\theta_c = 0.5)}\right)$$

relative to the clocking pitch fraction $\theta_C$ according to an exemplary embodiment of the present disclosure. More particularly, FIG. 15 provides a graph 1600 depicting $$\frac{\tau}{\tau(\theta_c = 0.5)}$$

as a function of the clocking pitch fraction $\theta_C$ where the midspan radius $R_{b\_mid}$ multiplied by the rotor speed 52 of the plurality of rotor blades 70, indicated as "U" in FIG. 15, is 1450 feet per second for the turbine section 27 having the 1:2 relationship discussed with respect to FIGS. 4A-4D.

For example, the graph 1600 provides the clocking pitch fraction $\theta_C$ on the X-axis 1605 and $$\frac{\tau}{\tau(\theta_c = 0.5)}$$

on the Y-axis 1610. The clocking pitch fraction $\theta_C$ includes the leading vane clocking pitch fraction $\theta_{CL}$ of the leading vane 401 and trailing vane clocking pitch fraction $\theta_{CT}$ of the trailing vane 402. The graph 1600 includes a first line 1615 indicating a relationship between the turbine stage durability factor $\tau$ and the clocking pitch fraction $\theta_C$ where the vane exit angle die is 65°. The graph 1600 includes a second line 1620 indicating a relationship between the turbine stage durability factor $\tau$ and the clocking pitch fraction $\theta_C$ where the vane exit angle $\alpha_{te}$ is 70°. The graph 1600 includes a third line 1625 indicating a relationship between the turbine stage durability factor $\tau$ and the clocking pitch fraction $\theta_C$ where the vane exit angle $\alpha_{te}$ is 75°. The graph 1600 also includes a fourth line 1630 indicating a relationship between the turbine stage durability factor $\tau$ and the clocking pitch fraction $\theta_C$ where the vane exit angle $\alpha_{te}$ is 80°.

Moreover, the graph 1600 depicts a lower bound 1635 where $$\frac{\tau}{\tau(\theta_c = 0.5)}$$

is equal to 1.003 and an upper bound 1640 where $$\frac{\tau}{\tau(\theta_c = 0.5)}$$

is equal to 1.271. Accordingly, a range 1645 is defined between the lower bound 1635 and the upper bound 1640 such that $$\frac{\tau}{\tau(\theta_c = 0.5)}$$

is greater than or equal to 1.003 and less than or equal to 1.271.

Figure 16:
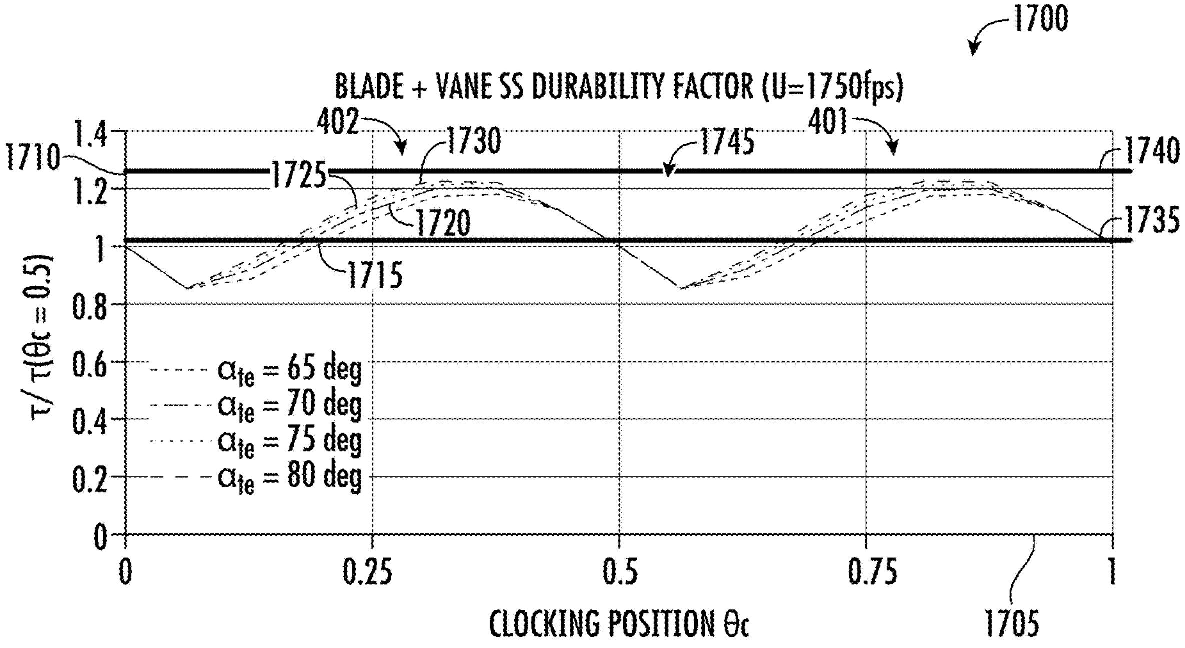
FIG. 16 is a graphical representation of a turbine stage durability factor relative to a clocking position according to an exemplary embodiment of the present disclosure.

FIG. 16 is a graphical representation of the turbine stage durability factor τ divided by the turbine stage durability factor τ at a clocking pitch fraction $\theta_C$ equal to $$0.5\left(\frac{\tau}{\tau(\theta_c = 0.5)}\right)$$

relative to the clocking pitch fraction $\theta_C$ according to an exemplary embodiment of the present disclosure. More particularly, FIG. 16 provides a graph 1700 depicting $$\frac{\tau}{\tau(\theta_c = 0.5)}$$

as a function of the clocking pitch fraction $\theta_C$ where the midspan radius $R_{b\_mid}$ multiplied by the rotor speed Ω of the plurality of rotor blades 70, indicated as "U" in FIG. 16, is 1750 feet per second for the turbine section 27 having the 1:2 relationship discussed with respect to FIGS. 4A-4D.

For example, the graph 1700 provides the clocking pitch fraction $\theta_C$ on the X-axis 1705 and $$\frac{\tau}{\tau(\theta_c = 0.5)}$$

on the Y-axis 1710. The clocking pitch fraction $\theta_C$ includes the leading vane clocking pitch fraction $\theta_{CL}$ of the leading vane 401 and trailing vane clocking pitch fraction $\theta_{CT}$ of the trailing vane 402. The graph 1700 includes a first line 1715 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle $\alpha_{te}$ is 65°. The graph 1700 includes a second line 1720 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle $\alpha_{te}$ is 70°. The graph 1700 includes a third line 1725 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle die is 75°. The graph 1700 also includes a fourth line 1730 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle Que is 80°.

Moreover, the graph 1700 depicts a lower bound 1735 where $$\frac{\tau}{\tau(\theta_c = 0.5)}$$

is equal to 1.003 and an upper bound 1740 where $$\frac{\tau}{\tau(\theta_c = 0.5)}$$

is equal to 1.2/1. Accordingly, a range 1745 is defined between the lower bound 1635 and the upper bound 1740 such that $$\frac{\tau}{\tau(\theta_c = 0.5)}$$

is greater than or equal to 1.003 and less than or equal to 1.271.

Figure 17:
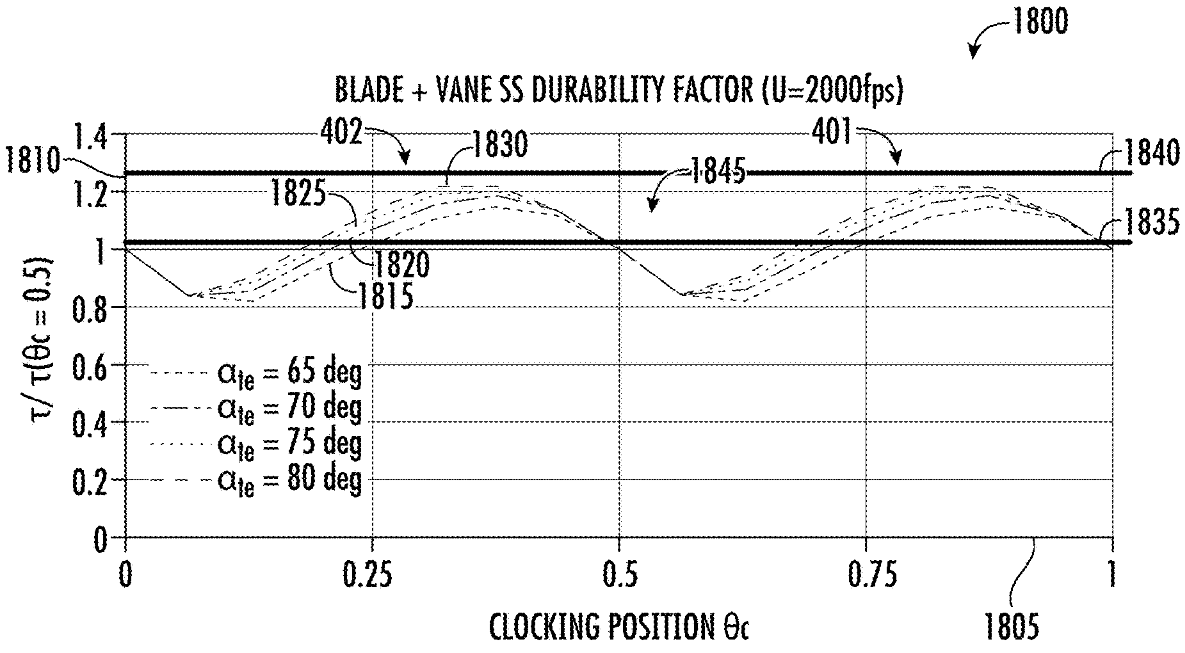
FIG. 17 provides a table listing values for various turbine airfoils durability factor characteristics for different example gas turbine engines according to exemplary embodiments of the present disclosure.

FIG. 17 is a graphical representation of the turbine stage durability factor τ divided by the turbine stage durability factor τ at a clocking pitch fraction $\theta_C$ equal to $$0.5\left(\frac{\tau}{\tau(\theta_c = 0.5)}\right)$$

relative to the clocking pitch fraction $\theta_C$ according to an exemplary embodiment of the present disclosure. More particularly, FIG. 17 provides a graph 1800 depicting $$\frac{\tau}{\tau(\theta_c = 0.5)}$$

as a function of the clocking pitch fraction $\theta_C$ where the midspan radius $R_{b\_mid}$ multiplied by the rotor speed Ω of the plurality of rotor blades 70, indicated as "U" in FIG. 17, is 2000 feet per second for the turbine section 27 having the 1:2 relationship discussed with respect to FIGS. 4A-4D.

For example, the graph 1800 provides the clocking pitch fraction $\theta_C$ on the X-axis 1805 and $$\frac{\tau}{\tau(\theta_c = 0.5)}$$

on the Y-axis 1810. The clocking pitch fraction $\theta_C$ may include the leading vane clocking pitch fraction $\theta_{CL}$ of the leading vane 401 and trailing vane clocking pitch fraction $\theta_{CT}$ of the trailing vane 402. The graph 1800 includes a first line 1815 indicating a relationship between the turbine stage durability factor τ divided by the turbine stage durability factor τ at a clocking pitch fraction $\theta_C$ equal to 0.5 and the clocking pitch fraction $\theta_C$ where the vane exit angle $\alpha_{te}$ is 65°. The graph 1800 includes a second line 1820 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 70°. The graph 1800 includes a third line 1825 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle die is 75°. The graph 1800 also includes a fourth line 1830 indicating a relationship between the turbine stage durability factor $\tau$ divided by the turbine stage durability factor $\tau$ at a clocking pitch fraction $\theta_C$ equal to 0.5 and the clocking pitch fraction $\theta_C$ where the vane exit angle $\alpha_{te}$ is 80°.

Moreover, the graph 1800 depicts a lower bound 1835 where the turbine stage $$\frac{\tau}{\tau(\theta_c = 0.5)}$$

is equal to 1.000 and an upper bound 1840 where the turbine stage $$\frac{\tau}{\tau(\theta_c = 0.5)}$$

is equal to 1.271. Accordingly, a range 1845 is defined between the lower bound 1835 and the upper bund 1840 such that $$\frac{\tau}{\tau(\theta_c = 0.5)}$$

is greater than or equal to 1.003 and less than or equal to 1.271.

Further aspects are provided by the subject matter of the following clauses:

A gas turbine engine, comprising: a compressor section; a combustion section defining a combustion chamber, the combustion section including a plurality of fuel nozzles in fluid communication with the combustion chamber, the plurality of fuel nozzles defining a fuel nozzle pitch extending between a fuel nozzle centerline of adjacent ones of the plurality of fuel nozzles; and a turbine section, the compressor section, the combustion section, and the turbine section disposed in serial flow order along a longitudinal centerline axis of the gas turbine engine, the turbine section comprising: a plurality of vanes, each vane of the plurality of vanes including a leading edge, a trailing edge, a pressure side extending between the leading edge and the trailing edge, and a suction side opposite the pressure side and extending between the leading edge and the trailing edge, a plurality of rotor blades configured to rotate at a rotor speed ($\Omega$) in radians per second about the longitudinal centerline axis, each rotor blade of the plurality of rotor blades including a blade leading edge, a blade trailing edge, a first blade side extending between the blade leading edge and the blade trailing edge, and a second blade side opposite the first blade side and extending between the blade leading edge and the blade trailing edge, each rotor blade of the plurality of rotor blades defining a blade chord extending between the blade leading edge and the blade trailing edge and a midspan radius ($R_{b\_mid}$) in feet extending between the first blade side and the second blade side opposite the first blade side at a center of the blade chord, wherein $R_{b\_mid} \cdot \Omega$ is greater than or equal to 1,250 feet per second and less than or equal to 2,000 feet per second; wherein each vane of the plurality of vanes defines a vane exit angle ($\alpha_{te}$) extending from the trailing edge relative to the longitudinal centerline axis, the vane exit angle ($\alpha_{te}$) is greater than or equal to 65 degrees and less than or equal to 80 degrees; wherein the turbine section defines a clocking pitch fraction ($\theta_C$) in degrees about the central axis, the clocking pitch fraction ($\theta_C$) defined between a peak temperature region and a midpoint of a vane pitch, the vane pitch defined between the leading edge of adjacent ones of the plurality of vanes; wherein the turbine section defines a suction side heat load ($\Lambda_S$) of the suction side and a pressure side heat load ($\Lambda_P$) of the pressure side of each of the plurality of vanes; wherein the turbine section defines a turbine durability factor ($\tau$) equal to:

$$\frac{1}{\Lambda_s + 20 \cdot \left[\left(1 - \frac{[0.7\Lambda_p + 0.3\Lambda_S]}{4}\right) \cdot \sin\alpha_{te} - 0.00025 \cdot R_{b\_mid} \cdot \Omega\right]^2};$$

and wherein $$1.003 < \frac{\tau}{\tau(\theta_c = 0.5)} < 1.271.$$

The gas turbine engine of any preceding clause, wherein: the turbine section comprises a plurality of vane segments; and one vane of the plurality of vanes extends from each of the plurality of vane segments.

The gas turbine engine of any preceding clause, wherein: the suction side heat load ($\Lambda_S$) is equal to: $0.5(1-\cos(2\pi(\theta_c+0.125)))$; and the pressure side heat load ($\Lambda_P$) is equal to: $0.5(1-\cos(2\pi(\theta_c-0.125)))$.

The gas turbine engine of any preceding clause, wherein the clocking pitch fraction ($\theta_C$) is greater than or equal to 0.51 times the fuel nozzle pitch and less than or equal to 0.81 times the fuel nozzle pitch.

The gas turbine engine of any preceding clause, wherein the clocking pitch fraction ($\theta_C$) is 0.65 times the fuel nozzle pitch.

The gas turbine engine of any preceding clause, wherein: the turbine section comprises a plurality of vane segments; and two vanes of the plurality of vanes extend from each of the plurality of vane segments.

The gas turbine engine of any preceding clause, wherein: the two vanes include a leading vane and a trailing vane; the turbine section defines a vane wake temperature difference ($\Delta_T$) based on the suction side heat load ($\Lambda_S$) of the suction side a pressure side heat load ($\Lambda_P$) of the pressure side of each of the plurality of vanes; the vane wake temperature difference ($\Delta_T$) includes a leading vane wake temperature difference ($\Delta_{TL}$) and a trailing vane wake temperature difference ($\Delta_{TT}$); the suction side heat load ($\Lambda_S$) includes a suction side heat load of the leading vane ($\Lambda_{LS}$) and a suction side heat load of the trailing vane ($\Lambda_{TS}$); and the pressure side heat load ($\Lambda_P$) includes a pressure side heat load of the leading vane ($\Lambda_{LP}$) and a pressure side heat load of the trailing vane ($\Lambda_{TP}$).

The gas turbine engine of any preceding clause, wherein: the suction side heat load of the leading vane ($\Lambda_{LS}$) is equal to: $0.5(1-\cos(2\pi(\theta_c+0.83)))$; and the pressure side heat load of the leading vane ($\Lambda_{LP}$) is equal to: $0.5(1-\cos(2\pi(\theta_c+0.67)))$.

The gas turbine engine of any preceding clause, wherein: the suction side heat load of the trailing vane ($\Lambda_{TS}$) is equal to: $0.5(1-\cos(2\pi(\theta_c+0.33)))$; and the pressure side heat load of the trailing vane ($\Lambda_{TP}$) is equal to: $0.5(1-\cos(2\pi(\theta_c+0.17)))$.

The gas turbine engine of any preceding clause, wherein the two vanes include a leading vane and a trailing vane, and wherein the clocking pitch fraction ($\theta_C$) is greater than or equal to 0.77 times the fuel nozzle pitch and less than or equal to 0.95 times the fuel nozzle pitch in degrees relative to the leading vane.

The gas turbine engine of any preceding clause, wherein the two vanes include a leading vane and a trailing vane, and wherein the clocking pitch fraction ($\theta_C$) is 0.85 times the fuel nozzle pitch in degrees relative to the leading vane. The gas turbine engine of any preceding clause, wherein the two vanes include a leading vane and a trailing vane, and wherein the clocking pitch fraction ($\theta_C$) is greater than or equal to 0.28 times the fuel nozzle pitch and less than or equal to 0.45 times the fuel nozzle pitch in degrees relative to the trailing vane.

The gas turbine engine of any preceding clause, wherein the two vanes include a leading vane and a trailing vane, and wherein the clocking pitch fraction ($\theta_C$) is 0.35 times the fuel nozzle pitch in degrees relative to the trailing vane.

The gas turbine engine of any preceding clause, wherein the turbine stage durability factor ($\tau$) is a maximum of a turbine stage durability factor of the leading vane ($\tau_{LV}$) and a turbine stage durability factor of the trailing vane ($\tau_{TV}$).

The gas turbine engine of any preceding clause, wherein the two vanes include a leading vane and a trailing vane, and wherein the pressure side of the trailing vane is aligned with a peak temperature region.

The gas turbine engine of any preceding clause, wherein: the plurality of vanes are clocked 0.28 to 0.45 times the fuel nozzle pitch in a direction opposite of rotation of the plurality of rotor blades from the fuel nozzle centerline extending through each of the plurality of fuel nozzles relative to the trailing vane.

The gas turbine engine of any preceding clause, wherein: a peak temperature angle between the peak temperature region and the fuel nozzle centerline is 0.3 times the fuel nozzle pitch; and the plurality of vanes are clocked 0.02 to 0.15 times the fuel nozzle pitch in a direction opposite of rotation of the plurality of rotor blades from the fuel nozzle centerline extending through each of the plurality of fuel nozzles relative to the trailing vane.

The gas turbine engine of any preceding clause, wherein the two vanes include a leading vane and a trailing vane, and wherein the pressure side of the leading vane is aligned with a peak temperature region.

The gas turbine engine of any preceding clause, wherein: the plurality of vanes are clocked 0.77 to 0.95 times the fuel nozzle pitch in a direction opposite of rotation of the plurality of rotor blades from the fuel nozzle centerline extending through each of the plurality of fuel nozzles.

The gas turbine engine of any preceding clause, wherein: the plurality of vanes are clocked 0.47 to 0.65 times the fuel nozzle pitch in a direction opposite of rotation of the plurality of rotor blades from the fuel nozzle centerline extending through each of the plurality of fuel nozzles.

The gas turbine engine of any preceding clause, wherein the vane wake temperature difference ($\Delta_T$) is equal to:

$$1-\frac{[0.7\Lambda_p+0.3\Lambda_s]}{4}.$$

The gas turbine engine of any preceding clause, wherein the combustion section comprises a rich burn combustor.

The gas turbine engine of any preceding clause, wherein the combustion section comprises a lean burn combustor.

A gas turbine engine, comprising: a compressor section; a combustion section defining a combustion chamber, the combustion section including a plurality of fuel nozzles in fluid communication with the combustion chamber, the plurality of fuel nozzles defining a fuel nozzle pitch extending between a fuel nozzle centerline of adjacent ones of the plurality of fuel nozzles; and a turbine section, the compressor section, the combustion section, and the turbine section disposed in serial flow order along a central axis of the gas turbine engine, the turbine section comprising a plurality of vane segments including one or more vanes extending from each of the plurality of vane segments, each of the one or more vanes comprise a leading edge, a trailing edge, a pressure side extending between the leading edge and the trailing edge, and a suction side opposite the pressure side and extending between the leading edge and the trailing edge; wherein each of the one or more vanes are offset a clocking angle relative to a fuel nozzle centerline extending through a center of the plurality of fuel nozzles such that the pressure side of the one or more vanes is aligned with the fuel nozzle centerline.

The gas turbine engine of any preceding clause, wherein the one or more vanes extending from each of the plurality of vane segments comprise one vane extending from each of the plurality of vane segments.

The gas turbine engine of any preceding clause, wherein: a fuel nozzle pitch is defined between the fuel nozzle centerline of adjacent ones of the one or more of vanes of the plurality of fuel nozzles; and the clocking angle is 0.52 times the fuel nozzle pitch to 0.8 times the fuel nozzle pitch in a direction opposite of rotation of a plurality of rotor blades of the turbine section from the fuel nozzle centerline.

The gas turbine engine of any preceding clause, wherein the one or more vanes extending from each of the plurality of vane segments comprise two vanes extending from each of the plurality of vane segments.

The gas turbine engine of any preceding clause, wherein a vane pitch is defined between the leading edge of adjacent ones of the one or more vanes of the plurality of vane segments.

The gas turbine engine of any preceding clause, wherein the two vanes include a leading vane and a trailing vane, and wherein the pressure side of the trailing vane is aligned with a peak temperature region.

The gas turbine engine of any preceding clause, wherein the clocking angle of the trailing vane is 0.28 to 0.45 times the fuel nozzle pitch in a direction opposite of rotation of a plurality of rotor blades of the turbine section from the fuel nozzle centerline.

The gas turbine engine of any preceding clause, wherein: a peak temperature angle between the peak temperature region and the fuel nozzle centerline is 0.3 times the fuel nozzle pitch; and the clocking angle is 0.02 to 0.15 times the fuel nozzle pitch in a direction opposite of rotation of a plurality of rotor blades of the turbine section from the fuel nozzle centerline.

The gas turbine engine of any preceding clause, wherein the two vanes include a leading vane and a trailing vane, and wherein the pressure side of the leading vane is aligned with a peak temperature region.

The gas turbine engine of any preceding clause, wherein the clocking angle of the leading vane is 0.77 to 0.95 times the fuel nozzle pitch in a direction opposite of rotation of a plurality of rotor blades of the turbine section from the fuel nozzle centerline.

The gas turbine engine of any preceding clause, wherein: a peak temperature angle between the peak temperature region and the fuel nozzle centerline is 0.3 times the fuel nozzle pitch; and the clocking angle is 0.47 to 0.65 times the fuel nozzle pitch in a direction opposite of rotation of a plurality of rotor blades of the turbine section from the fuel nozzle centerline.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine, comprising:

a compressor section;

a combustion section defining a combustion chamber, the combustion section including a plurality of fuel nozzles in fluid communication with the combustion chamber, the plurality of fuel nozzles defining a fuel nozzle pitch extending between a respective fuel nozzle centerline of adjacent ones of the plurality of fuel nozzles; and a turbine section, wherein the compressor section, the combustion section, and the turbine section are disposed in serial flow order along a longitudinal centerline axis of the gas turbine engine, the turbine section comprising:

a plurality of vanes, each vane of the plurality of vanes including a leading edge, a trailing edge, a pressure side extending between the leading edge and the trailing edge, and a suction side opposite the pressure side and extending between the leading edge and the trailing edge, and a plurality of rotor blades configured to rotate at a rotor speed (Q) in radians per second about the longitudinal centerline axis, each rotor blade of the plurality of rotor blades including a blade leading edge, a blade trailing edge, a first blade side extending between the blade leading edge and the blade trailing edge, and a second blade side opposite the first blade side and extending between the blade leading edge and the blade trailing edge, each rotor blade of the plurality of rotor blades defining a blade chord extending between the blade leading edge and the blade trailing edge and a midspan radius ($R_{b_{mid}}$) extending between the first blade side and the second blade side opposite the first blade side at a center of the blade chord, the midspan radius ($R_{b_{mid}}$) extending perpendicular to the longitudinal centerline axis and measured at a midspan location of each rotor blade, wherein $R_{b_{mid}} \cdot \Omega$ is greater than or equal to 1,250 feet per second and less than or equal to 2,000 feet per second;

wherein each vane of the plurality of vanes defines a vane exit angle ($\alpha_{te}$) extending from the trailing edge relative to the longitudinal centerline axis, the vane exit angle ($\alpha_{te}$) is greater than or equal to 65 degrees and less than or equal to 80 degrees;

wherein the turbine section defines a clocking pitch fraction ($\theta_C$) in degrees about the longitudinal centerline axis, the clocking pitch fraction ($\theta_C$) defined between a peak temperature region and a midpoint of a vane pitch, the vane pitch defined between the respective leading edge of adjacent ones of the plurality of vanes, wherein the clocking pitch fraction ($\theta_C$) comprises an angular offset of the peak temperature region from the midpoint of the vane pitch, and wherein the clocking pitch fraction ($\theta_C$) is greater than or equal to 0.51 times the fuel nozzle pitch and less than or equal to 0.81 times the fuel nozzle pitch;

wherein the turbine section defines a suction side heat load ($\Lambda_S$) of the suction side of each of the plurality of vanes and a pressure side heat load ($\Lambda_P$) of the pressure side of each of the plurality of vanes;

wherein the suction side heat load ($\Lambda_S$) is equal to:

$$0.5\ (1-\cos\ (2\pi\ (\theta_C+0.125)));$$

wherein the pressure side heat load ($\Lambda_P$) is equal to:

$$0.5\ (1-\cos\ (2\pi\ (\theta_C+0.125)));$$

wherein the turbine section defines a turbine durability factor ($\tau$) equal to:

$$\frac{1}{\Lambda_s+20\left[\left(1-\frac{[0.7\Lambda_p+0.3\Lambda_s]}{4}\right)\cdot\sin(\alpha_{te})-0.00025\cdot R_{b_{mid}}\cdot\Omega\right]^2};$$

and wherein $$1.003<\frac{\tau}{\tau(\theta_c=0.5)}<1.271.$$

2. The gas turbine engine of claim 1, wherein:

the turbine section comprises a plurality of vane segments; and one vane of the plurality of vanes extends from each of the plurality of vane segments.

3. The gas turbine engine of claim 1, wherein a peak temperature angle between the peak temperature region and a respective one of the fuel nozzle centerlines is 0.3 times the fuel nozzle pitch.

4. A gas turbine engine, comprising:

a compressor section;

a combustion section defining a combustion chamber, the combustion section including a plurality of fuel nozzles in fluid communication with the combustion chamber, the plurality of fuel nozzles defining a fuel nozzle pitch extending between a respective fuel nozzle centerline of adjacent ones of the plurality of fuel nozzles; and a turbine section comprising a plurality of vane segments, wherein the compressor section, the combustion section, and the turbine section are disposed in serial flow order along a longitudinal centerline axis of the gas turbine engine, the turbine section comprising:

a plurality of vanes, each vane of the plurality of vanes including a leading edge, a trailing edge, a pressure side extending between the leading edge and the trailing edge, and a suction side opposite the pressure side and extending between the leading edge and the trailing edge, wherein two vanes of the plurality of vanes extend from each of the plurality of vane segments, and wherein the two vanes of each of the plurality of vane segments include a leading vane and a trailing vane, and a plurality of rotor blades configured to rotate at a rotor speed (Ω) in radians per second about the longitudinal centerline axis, each rotor blade of the plurality of rotor blades including a blade leading edge, a blade trailing edge, a first blade side extending between the blade leading edge and the blade trailing edge, and a second blade side opposite the first blade side and extending between the blade leading edge and the blade trailing edge, each rotor blade of the plurality of rotor blades defining a blade chord extending between the blade leading edge and the blade trailing edge and a mid span radius ($R_{b_{mid}}$) extending between the first blade side and the second blade side opposite the first blade side at a center of the blade chord, the midspan radius ($R_{b_{mid}}$) extending perpendicular to the longitudinal centerline axis and measured at a midspan location of each rotor blade:

wherein $R_{b\_mid}\cdot\Omega$ is greater than or equal to 1.250 feet per second and less than or equal to 2,000 feet per second;

wherein each vane of the plurality of vanes defines a vane exit angle ($\alpha_{te}$) extending from the trailing edge relative to the longitudinal centerline axis, the vane exit angle ($\alpha_{te}$) is greater than or equal to 65 degrees and less than or equal to 80 degrees:

wherein the turbine section defines a clocking pitch fraction ($\theta_C$) in degrees about the longitudinal centerline axis, the clocking pitch fraction ($\theta_C$) defined between one of a plurality of peak temperature regions corresponding to a respective one of the plurality of fuel nozzles and a midpoint of a vane pitch, the vane pitch defined between the respective leading edge of adjacent ones of the plurality of vanes, wherein the clocking pitch fraction ($\theta_C$) comprises an angular offset of the peak temperature region from the midpoint of the vane pitch, wherein the clocking pitch fraction ($\theta_C$) is greater than or equal to 0.77 times the fuel nozzle pitch and less than or equal to 0.95 times the fuel nozzle pitch in degrees relative to the leading vanes, or wherein the clocking pitch fraction ($\theta_C$) is greater than or equal to 0.28 times the fuel nozzle pitch and less than or equal to 0.45 times the fuel nozzle pitch in degrees relative to the trailing vanes;

wherein the turbine section defines:

a suction side heat load of each of the leading vanes ($\Lambda_{LS}$) is equal to:

$$0.5(1-\cos(2\pi(\theta_c+0.83))),$$

a pressure side heat load of each of the leading vanes ($\Lambda_{LP}$) is equal to:

$$0.5(1-\cos(2\pi(\theta_c+0.67))),$$

a suction side heat load of each of the trailing vanes ($\Lambda_{TS}$) is equal to:

$$0.5(1-\cos(2\pi(\theta_c+0.33))),$$

and a pressure side heat load of each of the trailing vanes ($\Lambda_{TP}$) is equal to:

$$0.5(1-\cos(2\pi(\theta_c+0.17))),$$

wherein the turbine section defines a turbine durability factor (τ) including a leading vane turbine stage durability factor ($\tau_{LV}$) of each of the leading vanes and a trailing vane turbine stage durability factor ($\tau_{TV}$) of each of the trailing vanes;

wherein $$\tau_{LV}=\frac{1}{\Lambda_{LS}+20\cdot\left[\left(1-\frac{[0.7\Lambda_{LP}+0.3\Lambda_{LS}]}{4}\right)\cdot\sin(\alpha_{te})-0.00025\cdot R_{b_{mid}}\cdot\Omega\right]^2};$$

wherein $$\tau_{TV}=\frac{1}{\Lambda_{TS}+20\cdot\left[\left(1-\frac{[0.7\Lambda_{TP}+0.3\Lambda_{TS}]}{4}\right)\cdot\sin(\alpha_{te})-0.00025\cdot R_{b_{mid}}\cdot\Omega\right]^2};$$

wherein $\tau=\max(\tau_{LV},\tau_{TV})$; and wherein $$1.003<\frac{\tau}{\tau(\theta_c=0.5)}<1.271.$$

5. The gas turbine engine of claim 4, wherein the pressure side of each of the trailing vanes is aligned with a respective one of the peak temperature regions.

6. The gas turbine engine of claim 5, wherein:

the trailing vane of the two vanes of each of the plurality of segments are clocked 0.28 to 0.45 times the fuel nozzle pitch in a direction opposite of rotation of the plurality of rotor blades from a respective one of the fuel nozzle centerlines extending through each of the plurality of fuel nozzles relative to the trailing vane.

7. The gas turbine engine of claim 5, wherein the trailing vane of the two vanes of each of the plurality of segments are clocked 0.02 to 0.15 times the fuel nozzle pitch in a direction opposite of rotation of the plurality of rotor blades from a respective one of the fuel nozzle centerlines extending through each of the plurality of fuel nozzles relative to the trailing vane.

8. The gas turbine engine of claim 4, wherein the pressure side of each of the leading vanes is aligned with a respective one of the peak temperature regions.

9. The gas turbine engine of claim 8, wherein:

the leading vane of the two vanes of each of the plurality of segments are clocked 0.77 to 0.95 times the fuel nozzle pitch in a direction opposite of rotation of the plurality of rotor blades from a respective one of the fuel nozzle centerlines extending through each of the plurality of fuel nozzles.

* * * * *